United States Patent
Henmi

(10) Patent No.: US 10,171,707 B2
(45) Date of Patent: Jan. 1, 2019

(54) IMAGE FORMING APPARATUS

(71) Applicant: Oki Data Corporation, Tokyo (JP)

(72) Inventor: Yusuke Henmi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/487,689

(22) Filed: Apr. 14, 2017

(65) Prior Publication Data

US 2017/0331982 A1 Nov. 16, 2017

(30) Foreign Application Priority Data

May 11, 2016 (JP) .................................. 2016-095215

(51) Int. Cl.
*H04N 1/00* (2006.01)
*H04N 1/58* (2006.01)
*H04N 1/60* (2006.01)

(52) U.S. Cl.
CPC ....... *H04N 1/6027* (2013.01); *H04N 1/00748* (2013.01); *H04N 1/58* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 4,708,459 A * | 11/1987 | Cowan | ................... | G03F 3/105 355/40 |
| 6,058,201 A * | 5/2000 | Sikes | ................. | B41F 33/0045 250/559.07 |
| 6,499,402 B1 * | 12/2002 | Sikes | ..................... | B41F 13/12 101/171 |
| 6,561,643 B1 * | 5/2003 | Walker | ..................... | B41J 2/125 250/559.01 |
| 6,585,341 B1 * | 7/2003 | Walker | ..................... | B41J 2/125 250/559.44 |
| 2002/0135585 A1 * | 9/2002 | Dye | ......................... | G06T 1/60 345/531 |
| 2002/0145611 A1 * | 10/2002 | Dye | ......................... | G09G 5/14 345/543 |
| 2005/0030562 A1 * | 2/2005 | Hama | .................. | H04N 1/4078 358/1.9 |

(Continued)

FOREIGN PATENT DOCUMENTS

JP    2008-141623 A    6/2008

*Primary Examiner* — Madelein T Nguyen
(74) *Attorney, Agent, or Firm* — Rabin & Berdo, P.C.

(57) ABSTRACT

An image forming apparatus includes a communicator; a medium color input device; an image processor including a color image generator, an edge detector, and a corrector; and an image forming unit. The image processor performs a correction process that corrects first image data corresponding to a first color and second image data corresponding to a second color. The image processor performs the correction process by causing, based on medium color of the recording medium, a first edge of a first image that is in the first image data and a second edge of a second image that is in the second image data and initially correspond, to be distanced from each other. The image forming unit forms the first image and the second image in this order on the recording medium, based on the first image data and the second image data that are corrected by the image processor.

16 Claims, 21 Drawing Sheets

(56) References Cited

U.S. PATENT DOCUMENTS

| | | | |
|---|---|---|---|
| 2008/0055654 A1* | 3/2008 | Tamura | G06K 15/02 |
| | | | 358/3.26 |
| 2008/0259366 A1* | 10/2008 | Eguchi | H04N 1/58 |
| | | | 358/1.9 |
| 2010/0259771 A1* | 10/2010 | Sakamoto | H04N 1/40068 |
| | | | 358/1.2 |
| 2010/0322666 A1* | 12/2010 | Inomata | G03G 15/0896 |
| | | | 399/120 |
| 2012/0327479 A1* | 12/2012 | Komatsu | H04N 1/58 |
| | | | 358/3.06 |
| 2013/0330108 A1* | 12/2013 | Watanabe | G03G 15/5058 |
| | | | 399/301 |
| 2014/0118797 A1* | 5/2014 | Henmi | H04N 1/00331 |
| | | | 358/461 |
| 2015/0015918 A1* | 1/2015 | Eguchi | G06K 15/1872 |
| | | | 358/3.27 |
| 2016/0019847 A1* | 1/2016 | Yamazaki | G02F 1/13318 |
| | | | 345/207 |
| 2016/0072982 A1* | 3/2016 | Muraishi | H04N 1/58 |
| | | | 358/2.1 |
| 2016/0314599 A1* | 10/2016 | Genda | G06T 5/009 |
| 2017/0374233 A1* | 12/2017 | Henmi | H04N 1/00748 |

* cited by examiner

| UPPER PIXEL | 0 | 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|---|---|
| LOWER PIXEL | 0 | 0 | 0 | 0 | 1 | 1 | 1 | 1 | 0 | 0 | 0 | 0 | 1 | 1 | 1 | 1 |
| LEFT PIXEL | 0 | 0 | 1 | 1 | 0 | 0 | 1 | 1 | 0 | 0 | 1 | 1 | 0 | 0 | 1 | 1 |
| RIGHT PIXEL | 0 | 1 | 0 | 1 | 0 | 1 | 0 | 1 | 0 | 1 | 0 | 1 | 0 | 1 | 0 | 1 |
| EDGE DIRECTION | UPPER-LOWER-LEFT-RIGHT | RIGHT | LEFT | LEFT-RIGHT | LOWER | LOWER-RIGHT | LOWER-LEFT | LOWER-UPPER | UPPER | UPPER-RIGHT | UPPER-LEFT | UPPER-LOWER | UPPER-LOWER | RIGHT LEFT | ABSENT |

FIG. 6

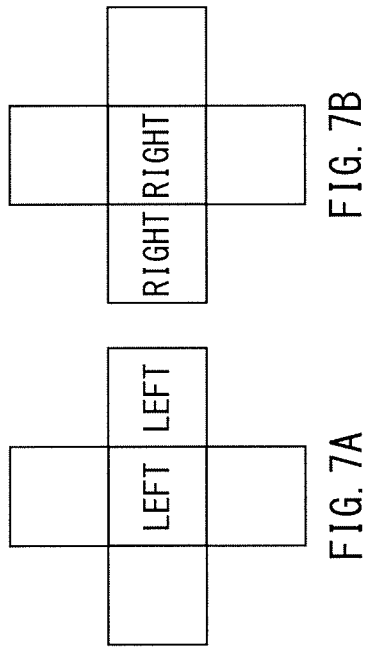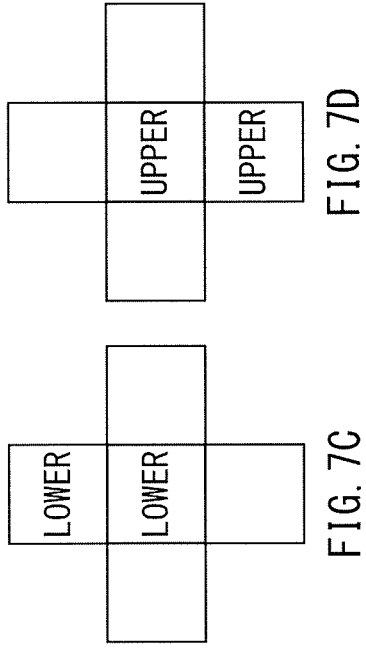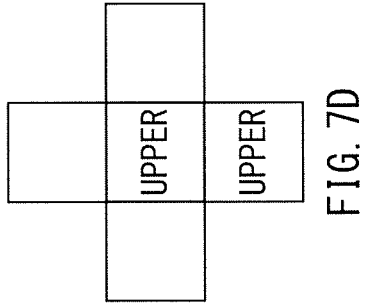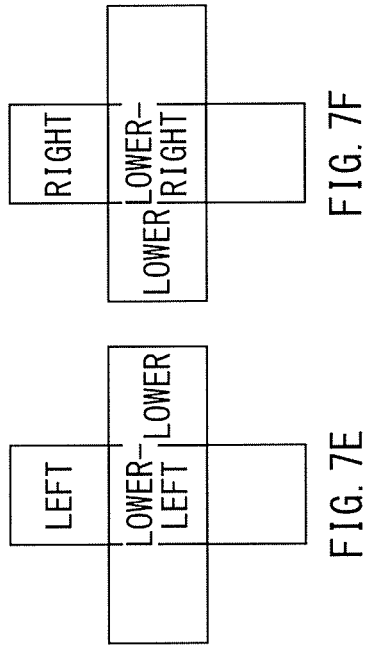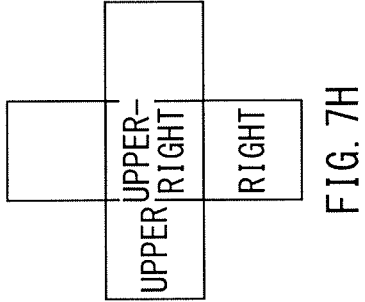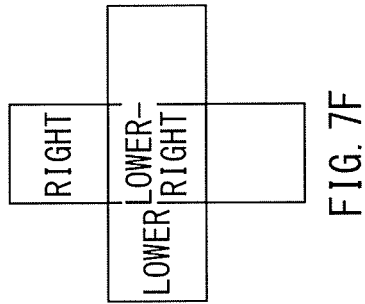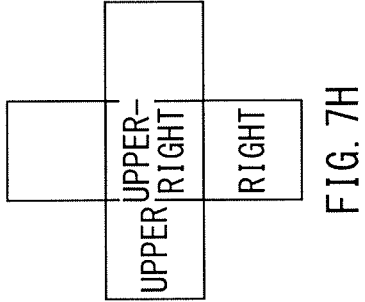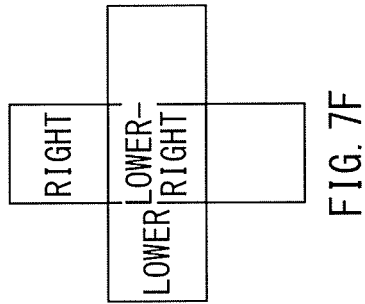

IMAGE FORMING APPARATUS

CROSS REFERENCE TO RELATED APPLICATIONS

The present application claims priority from Japanese Patent Application No. 2016-095215 filed on May 11, 2016, the entire contents of which are hereby incorporated by reference.

BACKGROUND

The technology relates to an image forming apparatus that forms an image on a recording medium.

An image forming apparatus often performs a so-called trapping process on image data in consideration of a shift between positions, on the recording medium, at which a plurality of color images having colors different from each other are formed. For example, Japanese Unexamined Patent Application Publication No. 2008-141623 discloses an image forming apparatus that improves image quality of a printed image by performing the trapping process.

SUMMARY

An image forming apparatus may often use, for example, a white developer in order to suppress an influence of a color of a recording medium on image quality. It is desirable that high image quality be achieved even in such a case where the white developer is used.

It is desirable to provide an image forming apparatus that improves image quality.

According to one embodiment of the technology, there is provided an image forming apparatus that includes an image processor and an image forming unit. The image processor performs a correction process that corrects first image data corresponding to a first color and second image data corresponding to a second color. The image processor performs the correction process by causing, on a basis of a medium color of a recording medium, a first edge of a first image that is in the first image data and a second edge of a second image that is in the second image data to be away from each other. The second edge corresponds to the first edge. The image forming unit forms the first image and the second image in this order on the recording medium, on a basis of the first image data and the second image data that are corrected by the image processor.

BRIEF DESCRIPTION OF DRAWINGS

FIG. 6 is a table illustrating an example of the edge detection process illustrated in FIG. 2.

FIGS. 7A to 7H each describe an example of the edge detection process illustrated in FIG. 2.

DETAILED DESCRIPTION

Some example embodiments of the technology are described below in detail in the following order with reference to the drawings.

1. First Example Embodiment
2. Second Example Embodiment

[1. First Example Embodiment]
[Configuration Example]

Figure 1:
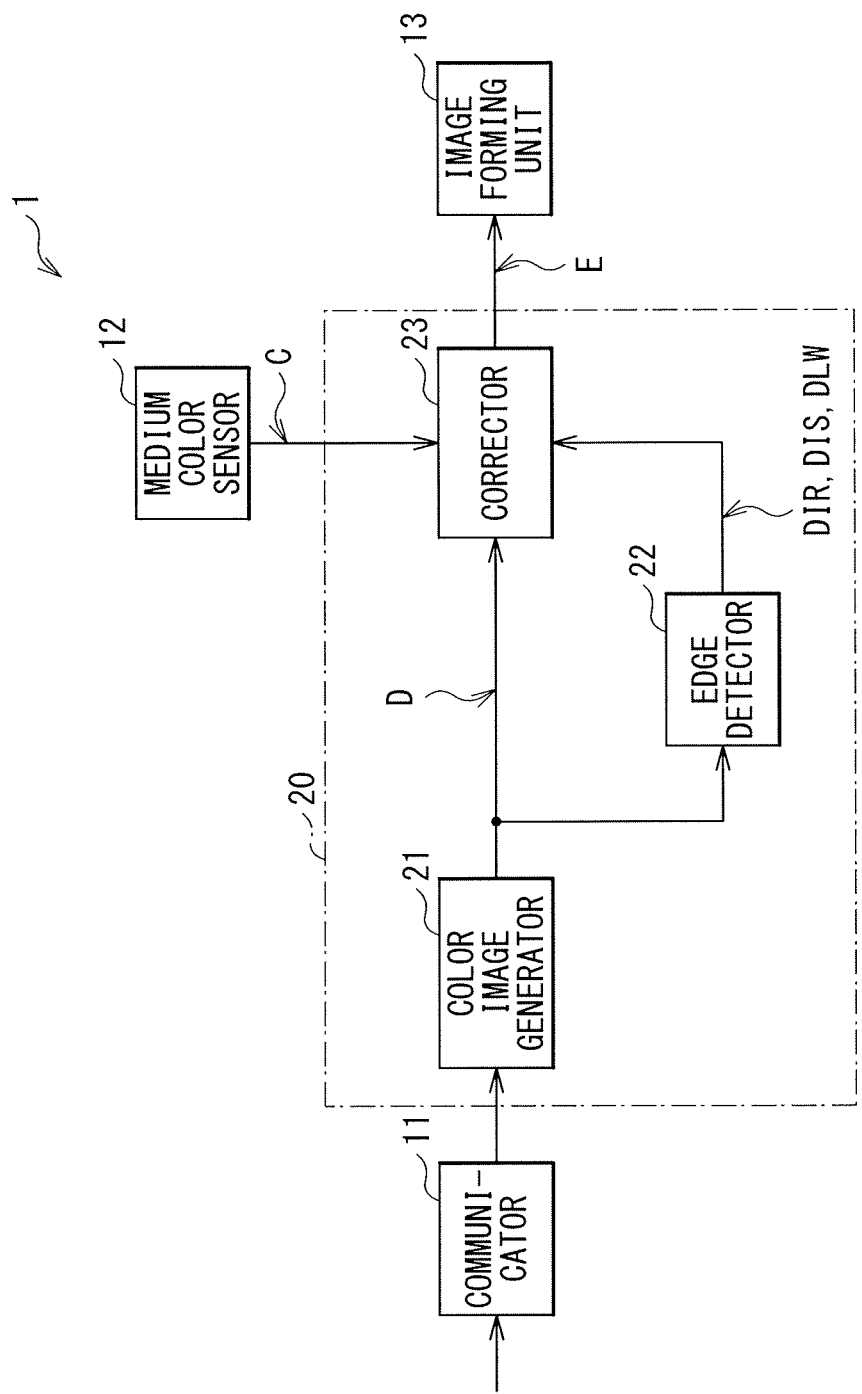
FIG. 1 is a block diagram illustrating a configuration example of an image forming apparatus according to a first example embodiment of the technology.

FIG. 1 illustrates a configuration example of an image forming apparatus (an image forming apparatus 1) according to a first example embodiment of the technology. The image forming apparatus 1 may function, for example, as a printer that forms an image on a recording medium 9 with a plurality of developers. Non-limiting examples of the recording medium 9 may include plain paper. The developers may include a white developer. The image forming apparatus 1 may include a communicator 11, a medium color sensor 12, an image processor 20, and an image forming unit 13.

The communicator 11 may receive print data DP by performing communication with an unillustrated host computer via a wired local area network (LAN), for example. The communicator 11 may supply the received print data DP to the image processor 20. It is to be noted that the communicator 11 in this example may use the wired LAN; however, this is not limitative. Alternatively, the communicator 11 may use a wireless LAN, for example. The communicator 11 in this example may use a network; however, this is not limitative. Alternatively, the communicator 11 may use a universal serial bus (USB), for example.

The medium color sensor 12 may detect a color of the recording medium 9 on which an image is to be formed by the image forming unit 13. The medium color sensor 12 may supply a result of the detection as medium color information C to the image processor 20.

The image processor 20 may generate five pieces of color image data D on the basis of the print data DP. Specifically, the five pieces of color image data D may be color image data DY, DM, DC, DK, and DW, which may be collectively referred to as the color image data D hereinafter. The image processor 20 may perform a trapping process on each of the pieces of color image data D. The image processor 20 may include hardware, or may include a processor that is able to execute a program, for example. The image processor 20 may include a color image generator 21, an edge detector 22, and a corrector 23.

The color image generator 21 may generate, on the basis of the print data DP, the five pieces of color image data D, i.e., the color image data DY, DM, DC, DK, and DW. The color image data DY may correspond to an image to be formed with a yellow developer. The color image data DM may correspond to an image to be formed with a magenta developer. The color image data DC may correspond to an image to be formed with a cyan developer. The color image data DK may correspond to an image to be formed with a black developer. The color image data DW may correspond to an image to be formed with the white developer.

The edge detector 22 may detect an edge of the image on the basis of the five pieces of color image data D. Specifically, the edge detector 22 may generate five pieces of edge direction data DIR, five pieces of edge distance data DIS, and five pieces of width data DLW, on the basis of the five pieces of color image data D, which will be described later. The five pieces of edge direction data DIR each may involve a map of edge direction information. The five pieces of edge distance data DIS each may involve a map of edge distance information. The five pieces of width data DLW each may involve a map of width information.

The corrector 23 may perform a correction process on the five pieces of color image data D, i.e., the color image data DY, DM, DC, DK, and DW, on the basis of the medium color information C, the five pieces of edge direction data DIR, the five pieces of edge distance data DIS, and the five pieces of width data DLW. The correction process may include the trapping process, for example. The corrector 23 may thereby generate five pieces of color image data E. Specifically, the five pieces of color image data E may be color image data EY, EM, EC, EK, and EW, which may be collectively referred to as the color image data E hereinafter. Specifically, the corrector 23 may generate the color image data EY by correcting the color image data DY. Similarly, the corrector 23 may generate the color image data EM by correcting the color image data DM. The corrector 23 may generate the color image data EC by correcting the color image data DC. The corrector 23 may generate the color image data EK by correcting the color image data DK. The corrector 23 may generate the color image data EW by correcting the color image data DW.

The image forming unit 13 may form the image on the recording medium 9 on the basis of the five pieces of color image data E. The image forming unit 13 may form the image on the recording medium 9 by means of developers of five colors that are yellow, magenta, cyan, black, and white. Specifically, the image forming unit 13 may form a yellow image by means of the yellow developer on the basis of the color image data EY. Similarly, the image forming unit 13 may form a magenta image by means of the magenta developer on the basis of the color image data EM. The image forming unit 13 may form a cyan image by means of the cyan developer on the basis of the color image data EC. The image forming unit 13 may form a black image by means of the black developer on the basis of the color image data EK. The image forming unit 13 may form a white image by means of the white developer on the basis of the color image data EW. Upon forming the images by means of the developers of the foregoing five colors, the image forming unit 13 may form, on the recording medium 9, the white image, the black image, the cyan image, the magenta image, and the yellow image, in this order. Accordingly, the white image may be formed at the bottom. The image forming apparatus 1 thus suppresses an influence of the color of the recording medium 9 on image quality.

The image processor 20 may correspond to an "image processor" according to one specific but non-limiting embodiment of the technology. The image forming unit 13 may correspond to an "image forming unit" according to one specific but non-limiting embodiment of the technology. The color image data DW may correspond to "first image data" according to one specific but non-limiting embodiment of the technology. Any one of the color image data DY, DM, DC, and DK may correspond to "second image data" according to one specific but non-limiting embodiment of the technology.

[Operation and Working]

Operations and workings of the image forming apparatus 1 according to the first example embodiment are described below.

[Outline of Overall Operation]

An outline of an overall operation of the image forming apparatus 1 is described below with reference to FIG. 1. The communicator 11 may receive the print data DP by performing communication with the host computer. The medium color sensor 12 may detect the color of the recording medium 9 on which the image forming unit 13 forms the image, and supply a result of the detection to the image processor 20 as the medium color information C. The color image generator 21 of the image processor 20 may generate the five pieces of color image data D, i.e., the color image data DY, DM, DC, DK, and DW, on the basis of the print data DP. The edge detector 22 may detect the edge of the image on the basis of the five pieces of color image data D. Specifically, the edge detector 22 may generate the five pieces of edge direction data DIR, the five pieces of edge distance data DIS, and the five pieces of width data DLW, on the basis of the five pieces of color image data D. The five pieces of edge direction data DIR each may involve the map of the edge direction information. The five pieces of edge distance data DIS each may involve the map of the edge distance information. The five pieces of width data DLW each may involve the map of the width information. The corrector 23 may perform the correction process on the five pieces of color image data D, i.e., the color image data DY, DM, DC, DK, and DW, on the basis of the medium color information C, the five pieces of edge direction data DIR, the five pieces of edge distance data DIS, and the five pieces of width data DLW. The correction process may include the trapping process, for example. The corrector 23 may thereby generate the five pieces of color image data E, i.e., the color image data EY, EM, EC, EK, and EW. The image forming unit 13 may form the image on the recording medium 9 on the basis of the five pieces of color image data E.

[Detailed Operation]

Figure 2:
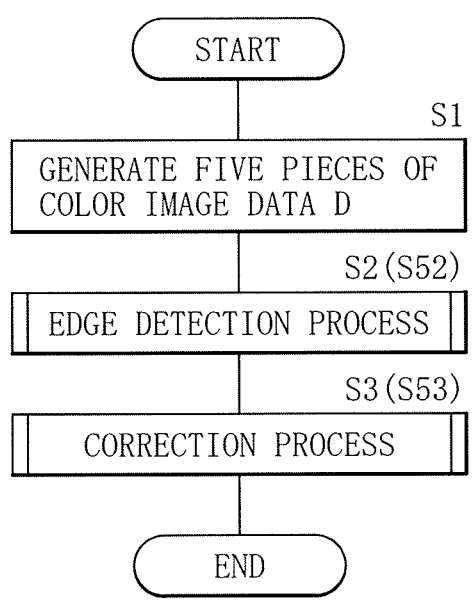
FIG. 2 is a flowchart illustrating an operation example of an image processor illustrated in FIG. 1.

FIG. 2 illustrates an operation example of the image processor 20. The image processor 20 may generate the five pieces of color image data D, i.e., the color image data DY, DM, DC, DK, and DW, on the basis of the print data DP. The image processor 20 may also perform the trapping process on each of the five pieces of generated color image data D. This operation is described below.

First, the color image generator 21 may generate the five pieces of color image data D, i.e., the color image data DY, DM, DC, DK, and DW, on the basis of the print data DP which the communicator 11 has received (step S1).

Thereafter, the edge detector 22 may perform an edge detection process on the five pieces of color image data D that have been generated in step S1 (step S2). Specifically, the edge detector 22 may generate the five pieces of edge direction data DIR, the five pieces of edge distance data DIS, and the five pieces of width data DLW, on the basis of the five pieces of color image data D. The five pieces of edge direction data DIR each may involve the map of the edge direction information. The five pieces of edge distance data DIS each may involve the map of the edge distance information. The five pieces of width data DLW each may involve the map of the width information.

Thereafter, the corrector 23 may perform the correction process on the five pieces of color image data D (step S3). Specifically, the corrector 23 may perform the trapping process on the five pieces of color image data D, i.e., the color image data DY, DM, DC, DK, and DW, on the basis of the medium color information C, the five pieces of edge direction data DIR, the five pieces of edge distance data DIS, and the five pieces of width data DLW, which will be described later in greater detail. The corrector 23 may thereby generate the five pieces of color image data E, i.e., the color image data EY, EM, EC, EK, and EW.

The image processor 20 may generate the five pieces of color image data E in the foregoing manner. The image forming unit 13 may form the image on the recording medium 9 on the basis of the five pieces of generated color image data E.

[Edge Detection Process]

The edge detection process which is performed in step S2 is described below in greater detail.

Figure 3:
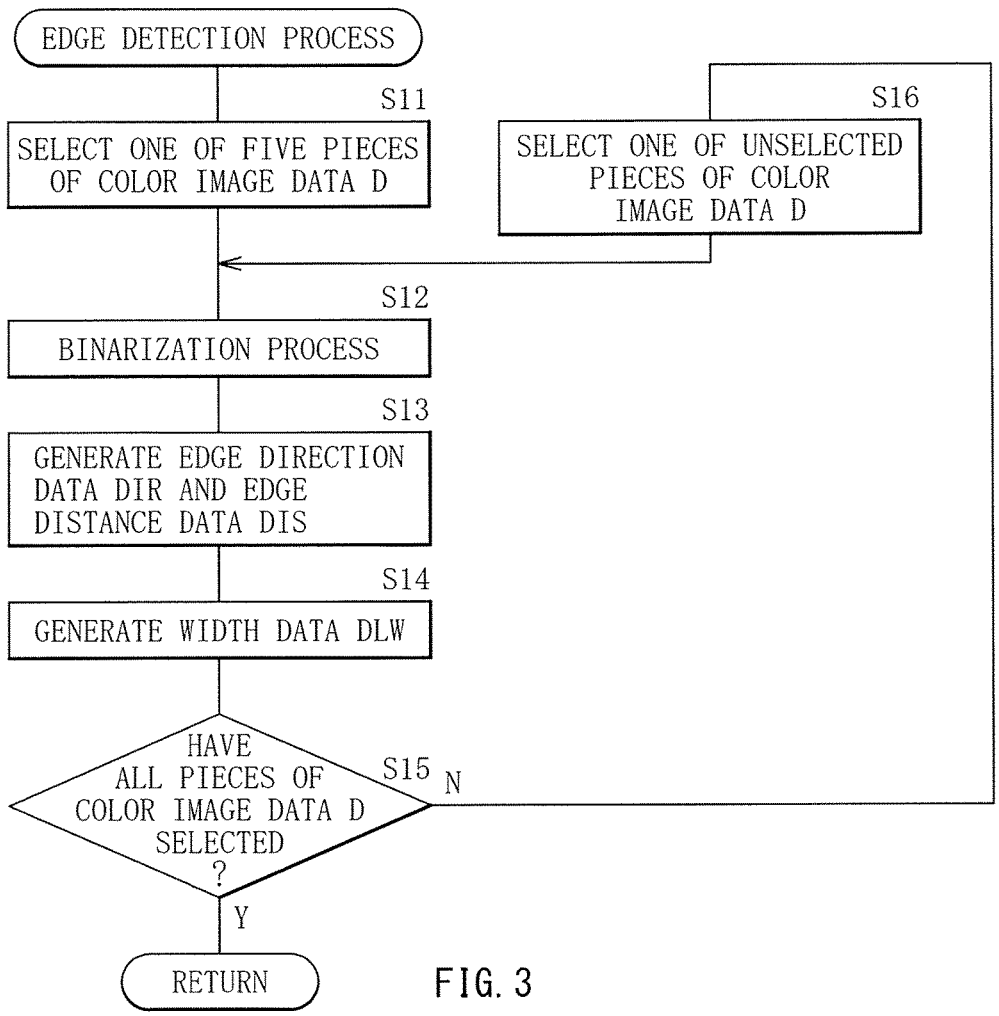
FIG. 3 is a flowchart illustrating an example of an edge detection process illustrated in FIG. 2.

FIG. 3 illustrates an example of the edge detection process. The edge detection process may generate the five pieces of edge direction data DIR, the five pieces of edge distance data DIS, and the five pieces of width data DLW, on the basis of the five pieces of color image data D. This operation is described below in greater detail.

First, the edge detector 22 may select one of the five pieces of color image data D, i.e., the color image data DY, DM, DC, DK, and DW (step S11).

Thereafter, the edge detector 22 may perform a binarization process on the selected color image data D (step S12). Specifically, the edge detector 22 may compare a pixel value of each pixel in the selected color image data D with a predetermined threshold TH1. Upon the comparison, in a case where the selected color image data D is one of the yellow color image data DY, the magenta color image data DM, the cyan color image data DC, and the black color image data DK, the edge detector 22 may cause the pixel to have the value of "1" when the compared pixel value is greater than the threshold TH1, and cause the pixel to have the value of "0" when the compared pixel value is smaller than the threshold TH1. In a case where the selected color image data D is the white color image data DW, the edge detector 22 may cause the pixel to have the value of "0" when the compared pixel value is greater than the threshold TH1, and cause the pixel to have the value of "1" when the compared pixel value is smaller than the threshold TH1.

Figure 4A:
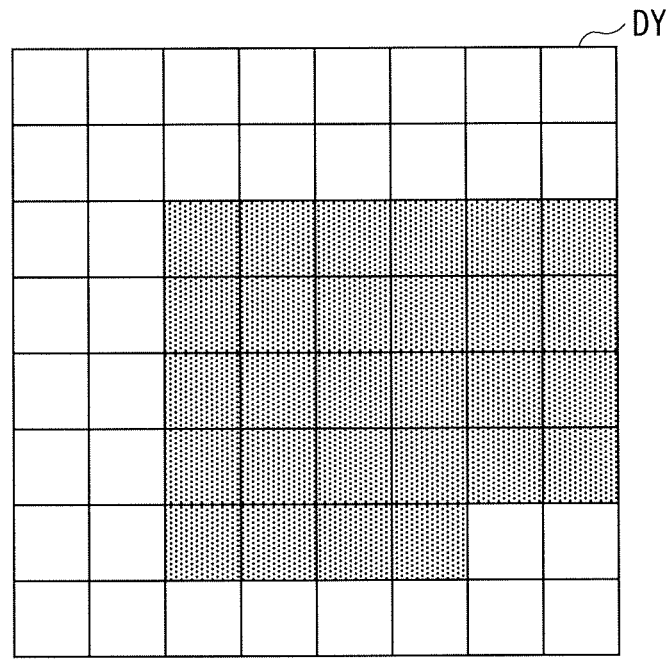
FIG. 4A is a diagram describing an example of a binarization process illustrated in FIG. 3.
Figure 4B:
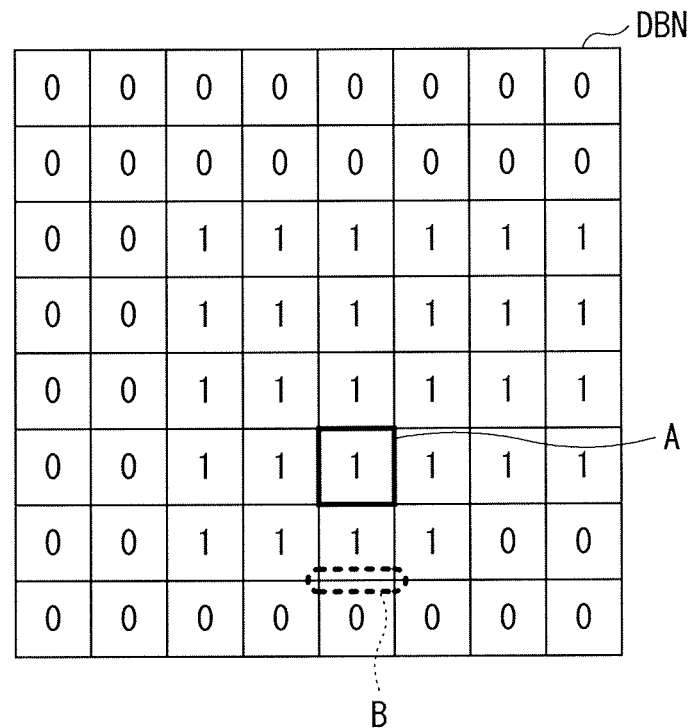
FIG. 4B is another diagram describing the example of the binarization process illustrated in FIG. 3.

FIGS. 4A and 4B illustrate an example of the binarization process to be performed on the yellow color image data DY. FIG. 4A schematically illustrates part of the color image data DY. FIG. 4B illustrates a result of the binarization process performed on the part of the color image data DY. The binarization process may be also similarly applicable to the magenta color image data DM, the cyan color image data DC, and the black color image data DK. In FIG. 4A, a shaded pixel may have a pixel value that is greater than the threshold TH1, and an unshaded pixel may have a pixel value that is smaller than the threshold TH1. The edge detector 22 may perform the binarization process on such color image data DY, and thereby generate binary data DBN that involves a map illustrated in FIG. 4B, for example. This example refers to a case where the selected color image data D is the yellow color image data DY. Accordingly, the edge detector 22 may cause the pixel to have the value of "1" when the compared pixel value is greater than the threshold TH1, and cause the pixel to have the value of "0" when the compared pixel value is smaller than the threshold TH1. In other words, the pixels each having the value of "1" in FIG. 4B may correspond to the respective shaded pixels in FIG. 4A. Similarly, the pixels each having the value of "0" in FIG. 4B may correspond to the respective unshaded pixels in FIG. 4A.

Figures 5A, 5B:
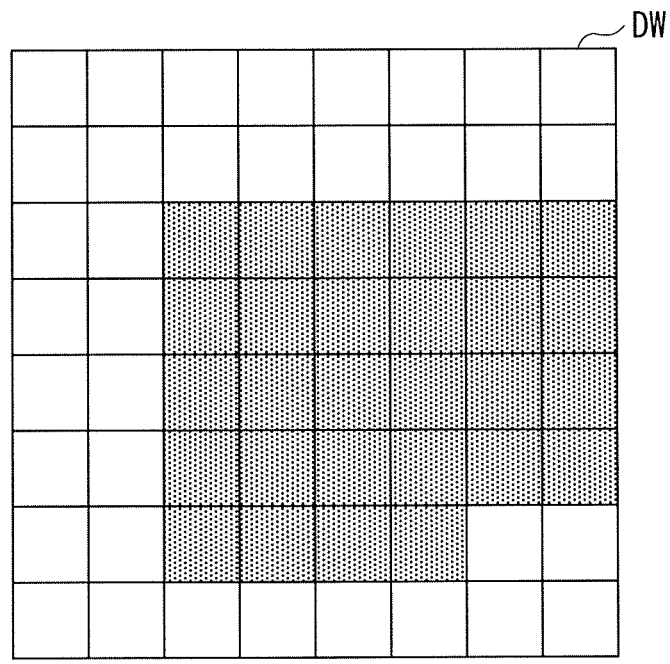
FIG. 5A is still another diagram describing the example of the binarization process illustrated in FIG. 3.
FIG. 5B is still another diagram describing the example of the binarization process illustrated in FIG. 3.

FIGS. 5A and 5B illustrate an example of the binarization process to be performed on the white color image data DW. FIG. 5A schematically illustrates part of the white color image data DW. FIG. 5B illustrates a result of the binarization process performed on the part of the color image data DW. In FIG. 5A, a shaded pixel may have a pixel value that is greater than the threshold TH1, and an unshaded pixel may have a pixel value that is smaller than the threshold TH1. The edge detector 22 may perform the binarization process on such color image data DW, and thereby generate the binary data DBN that involves a map illustrated in FIG. 5B, for example. This example refers to a case where the selected color image data D is the white color image data DW. Accordingly, the edge detector 22 may cause the pixel to have the value of "0" when the compared pixel value is greater than the threshold TH1, and cause the pixel to have the value of "1" when the compared pixel value is smaller than the threshold TH1. In other words, the pixels each having the value of "0" in FIG. 5B may correspond to the respective shaded pixels in FIG. 5A. The pixels each having the value of "1" in FIG. 5B may correspond to the respective unshaded pixels in FIG. 5A.

The edge detector 22 may generate the binary data DBN by performing the binarization process on the selected color image data D in the foregoing manner.

Thereafter, the edge detector 22 may generate the edge direction data DIR and the edge distance data DIS on the basis of the binary data DBN that has been generated in step S12 (step S13). This operation is described below in greater detail.

First, the edge detector 22 may sequentially select, as a target pixel A, one of the pixels having the value of "1" in the binary data DBN. Further, the edge detector 22 may generate the edge direction information for the target pixel A on the basis of the values ("0 or "1") which a pixel immediately above the target pixel A, a pixel immediately below the target pixel A, a pixel immediately on the left of the target pixel A, and a pixel immediately on the right of the target pixel A have. The pixels immediately above the target pixel A, the pixel immediately below the target pixel A, the pixel immediately on the left of the target pixel A, and the pixel immediately on the right of the target pixel A may be referred to as an upper pixel, a lower pixel, a left pixel, and a right pixel, of the target pixel A, respectively.

FIG. 6 illustrates an example of an operation of generating the edge direction information of the target pixel A. For example, the edge detector 22 may set the edge direction information of the target pixel A as "upper" when the upper pixel, the lower pixel, the left pixel, and the right pixel have the values of "1", "0", "0", and "0", respectively. Similarly, the edge detector 22 may set the edge direction information of the target pixel A as "lower" when the upper pixel, the lower pixel, the left pixel, and the right pixel have the values of "0", "1", "0", and "0", respectively. The edge detector 22 may set the edge direction information of the target pixel A as "left" when the upper pixel, the lower pixel, the left pixel, and the right pixel have the values of "0", "0", "1", and "0", respectively. The edge detector 22 may set the edge direction information of the target pixel A as "right" when the upper pixel, the lower pixel, the left pixel, and the right pixel have the values of "0", "0", "0", and "1", respectively. Further, for example, the edge detector 22 may set the edge direction information of the target pixel A as "upper-lower" when the upper pixel, the lower pixel, the left pixel, and the right pixel have the values of "1", "1", "0", and "0", respectively. The edge detector 22 may set the edge direction information of the target pixel A as "upper-left" when the upper pixel, the lower pixel, the left pixel, and the right pixel have the values of "1", "0", "1", and "0", respectively. The edge detector 22 may set the edge direction information of the target pixel A as "upper-right" when the upper pixel, the lower pixel, the left pixel, and the right pixel have the values of "1", "0", "0", and "1", respectively. Further, for example, the edge detector 22 may set the edge direction information of the target pixel A as "left" when the upper pixel, the lower pixel, the left pixel, and the right pixel have the values of "1", "1", "1", and "0", respectively. The edge detector 22 may set the edge direction information of the target pixel A as "right" when the upper pixel, the lower pixel, the left pixel, and the right pixel have the values of "1", "1", "0", and "1", respectively. Further, for example, the edge detector 22 may set the edge direction information of the target pixel A as "absent" when all of the upper pixel, the lower pixel, the left pixel, and the right pixel have the value of "1". The edge detector 22 may set the edge direction information of the target pixel A as "upper-lower-left-right" when all of the upper pixel, the lower pixel, the left pixel, and the right pixel have the value of "0".

Further, the edge detector 22 may set the edge distance information for the target pixel A to the value of "1" when the edge direction information for the target pixel A is other than "absent".

The edge direction information and the edge distance information may be thus generated for pixels that are located at outer-most positions inside a region having the value of "1" in the binary data DBN.

Thereafter, the edge detector 22 may sequentially select, as the target pixel A, one of the pixels the edge direction information for which is "absent". Further, the edge detector 22 may generate the edge direction information for the target pixel A on the basis of the edge direction information for each of a pixel immediately above the target pixel A, a pixel immediately below the target pixel A, a pixel immediately on the left of the target pixel A, and a pixel immediately on the right of the target pixel A. The pixels immediately above the target pixel A, the pixel immediately below the target pixel A, the pixel immediately on the left of the target pixel A, and the pixel immediately on the right of the target pixel A may be referred to as an upper pixel, a lower pixel, a left pixel, and a right pixel, of the target pixel A, respectively.

FIGS. 7A to 7H each illustrate an example of the operation of generating the edge direction information for the target pixel A on the basis of the edge direction information for each of the upper pixel, the lower pixel, the left pixel, and the right pixel, of the target pixel A. For example, referring to FIG. 7A, the edge detector 22 may set the edge direction information for the target pixel A as "left" when the edge direction information for the right pixel includes "left". Specifically, for example, the edge detector 22 may set the edge direction information for the target pixel A as "left" when the edge direction information for the right pixel is one of "left", "upper-left", "lower-left", "left-right", and "upper-lower-left-right". For example, referring to FIG. 7E, the edge detector 22 may set the edge direction information for the target pixel A as "lower-left" when the edge direction information for the upper pixel includes "left" and the edge direction information for the right pixel includes "lower".

The edge direction information may be generated for the pixels in order from those located at outer positions inside the region having the value of "1" in the binary data DBN by performing the foregoing process repeatedly. Further, the edge detector 22 may set, to the value of "2", the edge distance information for the pixel the edge direction information for which is generated when the foregoing process is performed once. The edge detector 22 may set, to the value of "3", the edge distance information for the pixel the edge direction information for which is generated when the foregoing process is performed twice. This setting is similarly applicable to the edge distance information for the pixel the edge direction information for which is generated when the foregoing process is performed three times or more. As a result, the edge distance information may be set to the values of "1", "2", "3", and so on for the pixels in order from those located at the outer-most positions inside the region having the value of "1" in the binary data DBN.

For example, the edge direction information for the target pixel A illustrated in FIG. 4B may be "upper", and the edge distance information for the target pixel A in FIG. 4B may be "2". In other words, this edge direction information and the edge distance information may indicate that the target pixel A is on the "upper" side of an edge part B that is nearest to the target pixel A, and the target pixel A is the "second (2)" pixel counted from the edge part B.

The edge direction information and the edge distance information may be thus generated for all of the pixels having the value of "1" in the binary data DBN. Further, the edge detector 22 may generate the edge direction data DIR on the basis of the edge direction information for each of the pixels, and generate the edge distance data DIS on the basis of the edge distance information for each of the pixels. The edge direction data DIR may involve the map of the edge direction information. The edge distance data DIS may involve the map of the edge distance information.

Thereafter, the edge detector 22 may generate the width data DLW on the basis of the edge direction data DIR and the edge distance data DIS that have been generated in step S13 (step S14). Specifically, the edge detector 22 may sequentially select, as a target pixel A, one of the pixels having the value of "1" in the binary data DBN. Further, the edge detector 22 may determine, on the basis of the edge direction information for the target pixel A, the number of the pixels having the value of "1" that are present in a continuous manner in a direction indicated by the edge direction information and a direction opposite to the direction indicated by the edge direction information. For example, the edge detector 22 may determine the number of the pixels having the value of "1" that are present in a continuous manner in an upper-lower direction of the target pixel A when the edge direction information for the target pixel A is one of "upper", "lower", and "upper-lower". Alternatively, for example, the edge detector 22 may determine the number of the pixels having the value of "1" that are present in a continuous manner in a left-right direction of the target pixel A when the edge direction information for the target pixel A is one of "left", "right", and "left-right". Alternatively, for example, the edge detector 22 may determine the number of the pixels having the value of "1" that are present in a continuous manner in the upper-lower direction or the left-right direction of the target pixel A when the edge direction information for the target pixel A is one of "upper-right", "lower-right", "upper-left", and "lower-left". Further, the edge detector 22 may set the value determined in the foregoing manner as the width information for the target pixel A.

For example, the edge direction information for the target pixel A illustrated in FIG. 4B may be "upper", and the edge distance information for the target pixel A illustrated in FIG. 4B may be "2". Accordingly, the edge detector 22 may determine the number of the pixels having the value of "1" that are present in a continuous manner in the upper-lower direction. In this example, five pixels having the value of "1" may be present in a continuous manner in the upper-lower direction. Accordingly, the edge detector 22 may set the width information for the target pixel A to "5".

The width information may be thus generated for all of the pixels having the value of "1" in the binary data DBN. Further, the edge detector 22 may generate, on the basis of the width information for each of the pixels, the width data DLW involving the map of the width information.

Thereafter, the edge detector 22 may determine whether all the pieces of color image data D have been selected (step S15). When not all the pieces of color image data D have been selected ("N" in step S15), the edge detector 22 may select one of the unselected piece of color image data D (step S16), and the operation may return to step S12. The processes in step S12 to S16 may be performed repeatedly until all the pieces of color image data D are selected. The edge detection process may be brought to the end when all the pieces of color image data D have been selected ("Y" in step S15).

[Correction Process]

The correction process in step S3 illustrated in FIG. 2 is described below in greater detail.

Figure 8:
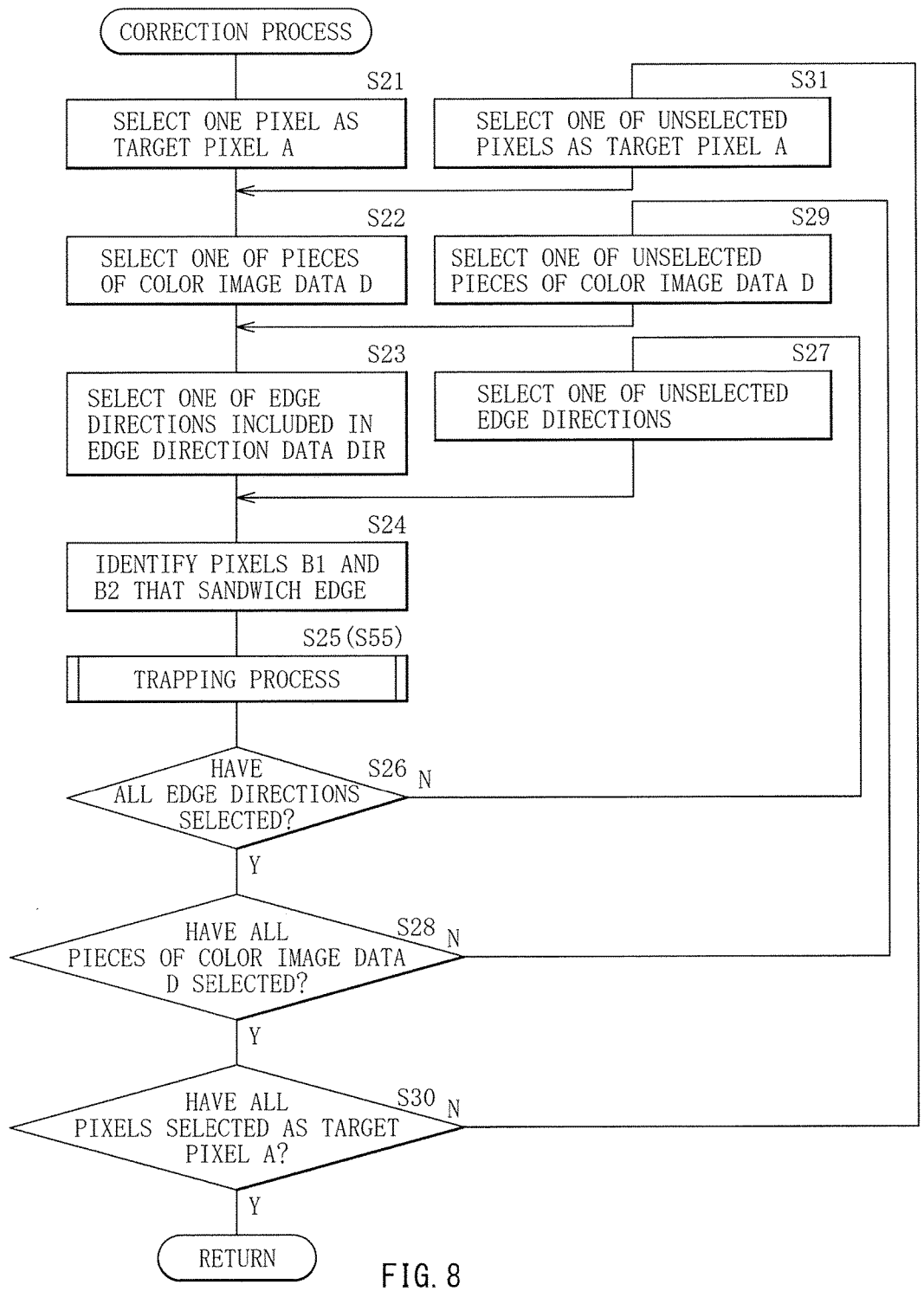
FIG. 8 is a flowchart illustrating an example of a correction process illustrated in FIG. 2.
Figure 9:
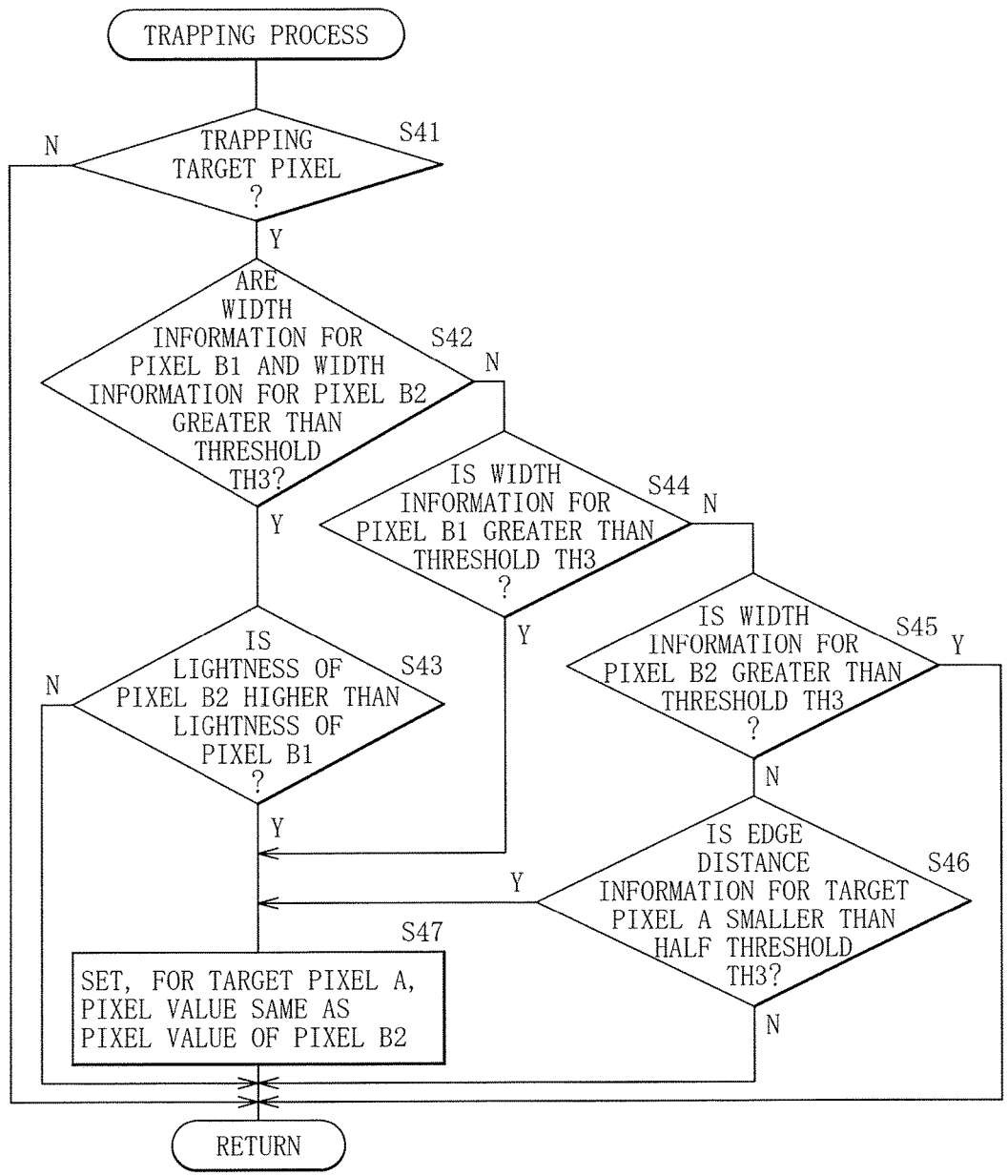
FIG. 9 is a flowchart illustrating an example of a trapping process illustrated in FIG. 8.

FIGS. 8 and 9 illustrate an example of the correction process. The correction process may involve performing of the trapping process on the five pieces of color image data D on the basis of the medium color information C, the five pieces of edge direction data DIR, the five pieces of edge distance data DIS, and the five pieces of width data DLW. This operation is described below in greater detail.

First, the corrector 23 may select one of the pixels as the target pixel A (step S21). The corrector 23 may also select one of the five pieces of color image data D (step S22). Further, the corrector 23 may select one of the edge directions included in the edge direction information for the target pixel A in the edge direction data DIR of the selected color image data D on the basis of such edge direction information (step S23). Specifically, for example, when the edge direction information is "upper-left", one of the edge directions, for example, "left" may be selected first.

Thereafter, the corrector 23 may identify two pixels B1 and B2 that sandwich an edge in between (step S24).

Figure 10:
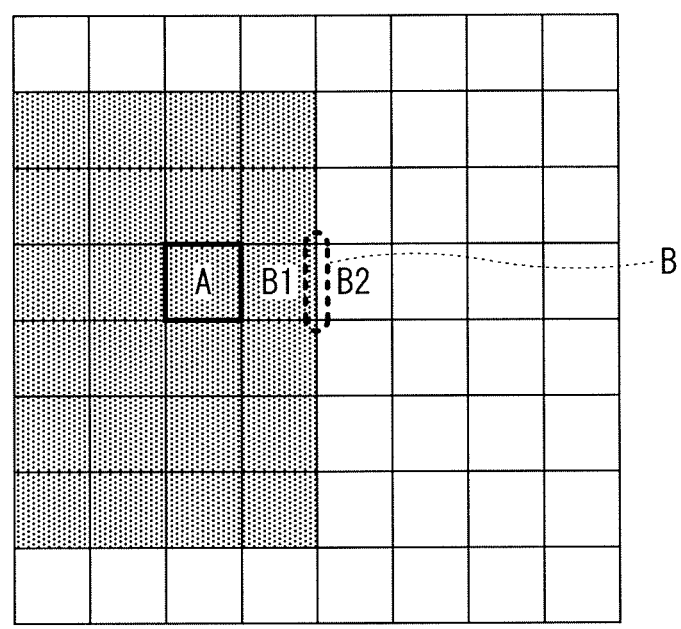
FIG. 10 describes an example of the correction process illustrated in FIG. 2.

FIG. 10 illustrates an example of an operation of identifying the pixels B1 and B2. FIG. 10 illustrates the binary data DBN of the selected color image data D. A shaded pixel may represent a pixel having the value of "1", and an unshaded pixel may represent a pixel having the value of "0". In this example, the edge direction information for the target pixel A may be "left", and the edge distance information for the target pixel A may be "2". The corrector 23 may identify the edge on the basis of the edge direction information and the edge distance information. Specifically, the edge part B may be located between the pixel B1 that is located on the right of the target pixel A at a distance corresponding to one pixel from the target pixel A, and the pixel B2 that is located on the right of the target pixel A at a distance corresponding to two pixels from the target pixel A. The pixel B1 may be located closer to the target pixel A, and the pixel B2 may be located farther from the target pixel A. In other words, the pixel B1 may be located at a position having a distance, which corresponds to a value smaller by one than the value indicated by the edge distance information, from the target pixel A in a direction opposite to the edge direction indicated by the edge direction information. The pixel B2 may be located at a position having a distance, which corresponds to the value indicated by the edge distance information, from the target pixel A in the direction opposite to the edge direction indicated by the edge direction information.

The corrector 23 may thus identify the pixels B1 and B2 that sandwich the edge part B in between, on the basis of the edge direction information and the edge distance information for the target pixel A.

Thereafter, the corrector 23 may perform the trapping process (step S25).

Referring to FIG. 9, the corrector 23 may first determine whether the target pixel A in the selected color image data D is a trapping target pixel which is to be subjected to the trapping process (step S41). Specifically, the corrector 23 may determine that the target pixel A is the trapping target pixel when the following two conditions are satisfied.

A first condition may be that the edge distance information for the target pixel A is equal to or smaller than a predetermined threshold TH2 that is set in advance. In other words, when the first condition is satisfied, the target pixel A may be close to the edge part B in the selected color image data D. The threshold TH2 may be set in advance on the basis of a shift amount by which positions, at which the respective yellow, magenta, cyan, black, and white images are formed, are shifted relative to each other, when the image forming unit 13 forms the respective yellow, magenta, cyan, black, and white images on the recording medium 9. For example, the threshold TH2 may be set to the value of "2" when the foregoing shift amount corresponds to two pixels. In this case, the first condition is satisfied, for example, when the value indicated by the edge distance information for the target pixel A is equal to or smaller than "2". The first condition is not satisfied, for example, when the value indicated by the edge distance information for the target pixel A is "3".

A second condition may be that one of the pixels B1 and B2 has the value of "1" in the binary data DBN of only one piece of the color image data DY, DM, DC, and DK, and the other of the pixels B1 and B2 has the value of "1" in the binary data DBN of only the color image data DW. In other words, when the second condition is satisfied, one of the pixels B1 and B2 in only one piece of the color image data DY, DM, DC, and DK and in the color image data DW may have a pixel value that is greater than the threshold TH1, and the other of the pixels B1 and B2 in all the pieces of color image data DY, DM, DC, DK, and DW may have a pixel value that is smaller than the threshold TH1. The second condition may be satisfied, for example, when the pixel B1 has a magenta pixel value and a white pixel value and the pixel B2 has no pixel value for any of the colors. The second condition may not be satisfied, for example, when the pixel B1 has the magenta pixel value and a yellow pixel value.

The corrector 23 may determine that the target pixel A is the trapping target pixel when the foregoing two conditions are satisfied. When the target pixel A is not the trapping target pixel ("N" in step S41), the trapping process may be brought to the end.

When the target pixel A is the trapping target pixel in step S41 ("Y" in step S41), the corrector 23 may determine whether both the width information for the pixel B1 and the width information for the pixel B2 are greater than a predetermined threshold TH3 (step S42). Specifically, for example, when the binary data DBN of the magenta color image data DM has the value of "1" at the pixel B1, and the binary data DBN of the white color image data DW has the value of "1" at the pixel B2, the corrector 23 may determine whether both the width information for the pixel B1 in the width data DLW of the magenta color image data DM and the width information for the pixel B2 in the width data DLW of the white color image data DW are greater than the threshold TH3.

When both the width information for the pixel B1 and the width information for the pixel B2 are greater than the threshold TH3 in step S42 ("Y" in step S42), the corrector 23 may determine whether lightness of the pixel B2 is higher than lightness of the pixel B1 (step S43). Specifically, for example, when the binary data DBN of the magenta color image data DM has the value of "1" at the pixel B1, and the binary data DBN of the white color image data DW has the value of "1" at the pixel B2, the corrector 23 may determine whether lightness determined on the basis of the medium color information C is higher than lightness determined on the basis of the pixel value of the pixel B1 in the magenta color image data DM. Specifically, in this example, the pixel B2 has no pixel value for any of the colors. The lightness may be therefore determined on the basis of the medium color information C indicating the color of the recording medium 9, and the determined lightness may be used as the lightness of the pixel B2. The lightness may correspond to a "lightness level" according to one specific but non-limiting embodiment of the technology. When the lightness of the pixel B2 is higher than the lightness of the pixel B1 ("Y" in step S43), the operation may proceed to step S47. When the lightness of the pixel B2 is lower than the lightness of the pixel B1 ("N" in step S43), the trapping process may be brought to the end.

When at least one of the width information for the pixel B1 and the width information for the pixel B2 is smaller than the threshold TH3 in step S42 ("N" in step S42), the corrector 23 may determine whether the width information for the pixel B1 is greater than the threshold TH3 (step S44). When the width information for the pixel B1 is greater than the threshold TH3 ("Y" in step S42), the operation may proceed to step S47.

When the width information for the pixel B1 is smaller than the threshold TH3 in step S44 ("N" in step S44), the corrector 23 may determine whether the width information for the pixel B2 is greater than the threshold TH3 (step S45).

When the width information for the pixel B2 is greater than the threshold TH3 ("Y" in step S45), the trapping process may be brought to the end.

When the width information for the pixel B2 is smaller than the threshold TH3 in step S45 ("N" in step S45), the corrector 23 may determine whether the edge distance information for the target pixel A is smaller than half (TH3/2) of the threshold TH3 (step S46). When the edge distance information for the target pixel A is smaller than the half of the threshold TH3 ("Y" in step S46), the operation may proceed to step S47. When the edge distance information for the target pixel A is greater than the half of the threshold TH3 ("N" in step S46), the trapping process may be brought to the end.

Thereafter, the corrector 23 may set, for the target pixel A, a pixel value that is the same as the pixel value of the pixel B2 (step S47).

Specifically, for example, when the binary data DBN of the white color image data DW has the value of "1" at the pixel B1, and the binary data DBN of the magenta color image data DM has the value of "1" at the pixel B2, the corrector 23 may set, for the target pixel A in the magenta color image data DM, a pixel value that is the same as the pixel value of the pixel B2 in the magenta color image data DM. This increases a region of the magenta image.

Alternatively, for example, when the binary data DBN of the magenta color image data DM has the value of "1" at the pixel B1, and the binary data DBN of the white color image data DW has the value of "1" at the pixel B2, the corrector 23 may set, for the target pixel A in the white color image data DW, a pixel value that is the same as the pixel value of the pixel B2 in the white color image data DW. In this case, the pixel value of the pixel B2 may be smaller than the threshold TH1 in the white color image data DW. Accordingly, the pixel value of the target pixel A may be set to such a value that is sufficiently small. This reduces a region of the white image.

This may bring the trapping process to the end.

Referring to FIG. 8, thereafter, the corrector 23 may determine whether all of the edge directions are selected for the target pixel A in the selected color image data D (step S26). When not all of the edge directions are selected ("N" in step S26), the corrector 23 may select one of the unselected edge directions (step S27), and the operation may return to step S24. The processes in steps S24 to S27 may be performed repeatedly until all of the edge directions are selected. When all of the edge directions are selected ("Y" in step S26), the operation may proceed to step S28.

Thereafter, the corrector 23 may determine whether all the pieces of color image data D are selected (step S28). When not all the pieces of color image data D are selected ("N" in step S28), the corrector 23 may select one of the unselected pieces of color image data D (step S29), and the operation may return to step S23. The processes in steps S23 to S29 may be performed repeatedly until all the pieces of color image data D are selected. When all the pieces of color image data D are selected ("Y" in step S28), the operation may proceed to step S30.

Thereafter, the corrector 23 may determine whether all of the pixels are selected as the target pixel A (step S30). When not all of the pixels are selected ("N" in step S30), the corrector 23 may select one of the unselected pixels (step S31), and the operation may return to step S22. The processes in steps S22 to S31 may be performed repeatedly until all of the pixels are selected. When all of the pixels are selected ("Y" in step S30), the correction process may be brought to the end.

The corrector 23 may thus generate the five pieces of color image data E by performing correction on the five pieces of color image data D. The image forming unit 13 may form the images on the recording medium 9 on the basis of the five pieces of generated color image data E.

The operation of the image forming apparatus 1 is described below referring to some examples.

[Specific Example 1]

Figure 11:
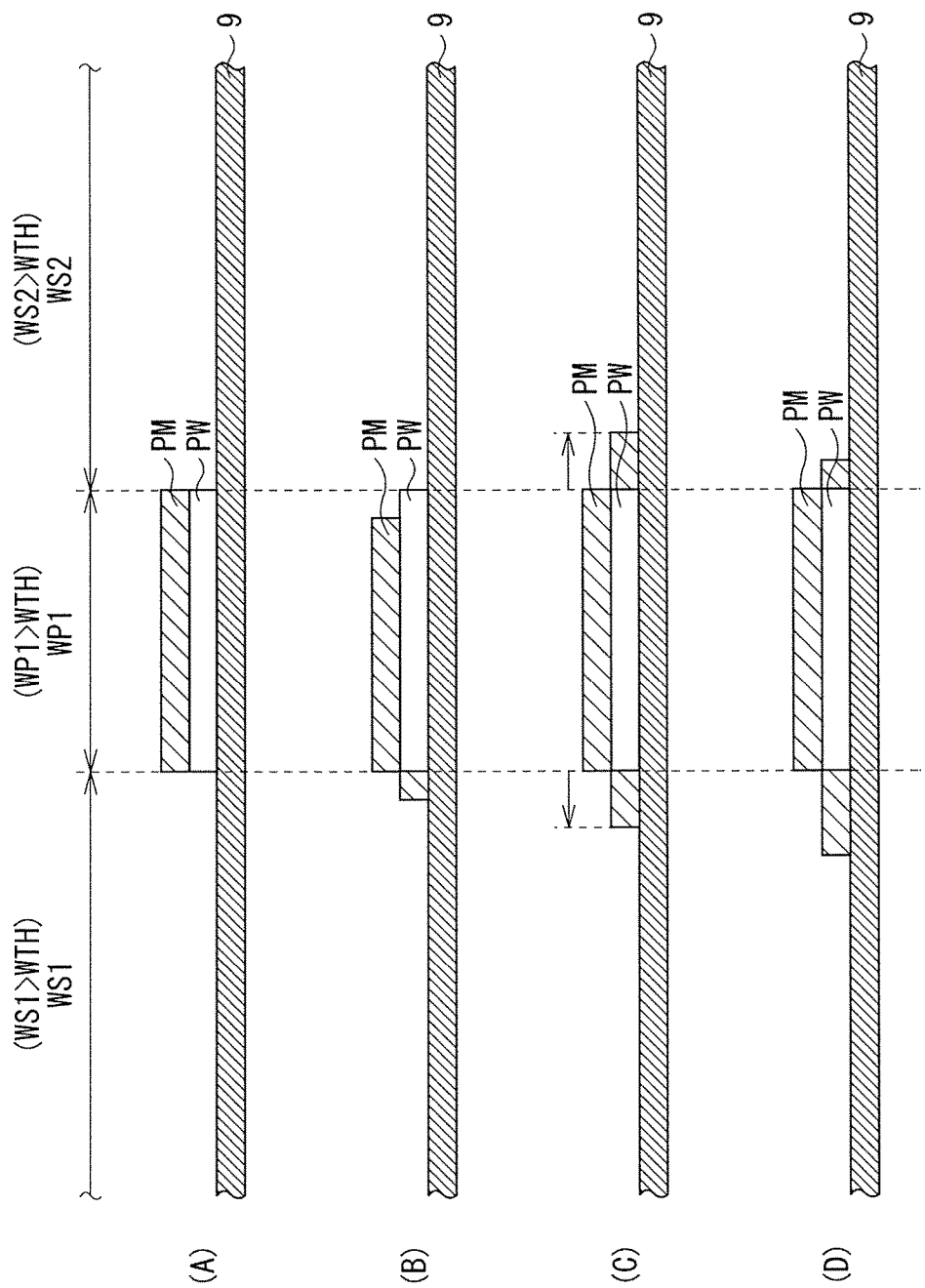
FIG. 11 describes an operation example of the image forming apparatus illustrated in FIG. 1.
Figure 12:
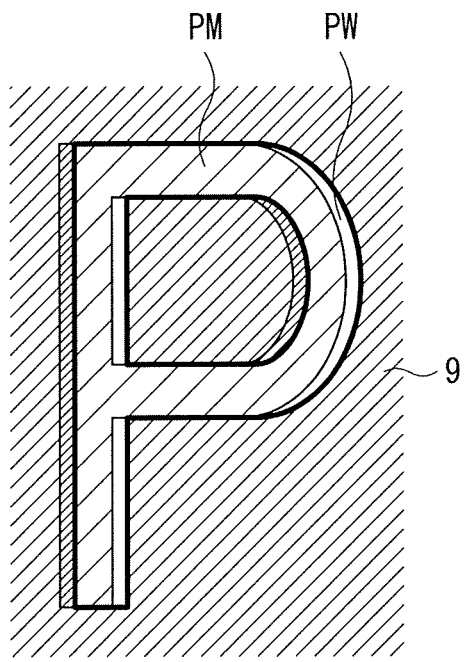
FIG. 12 describes an example of an image formed by the image forming apparatus illustrated in FIG. 1.
Figure 13:
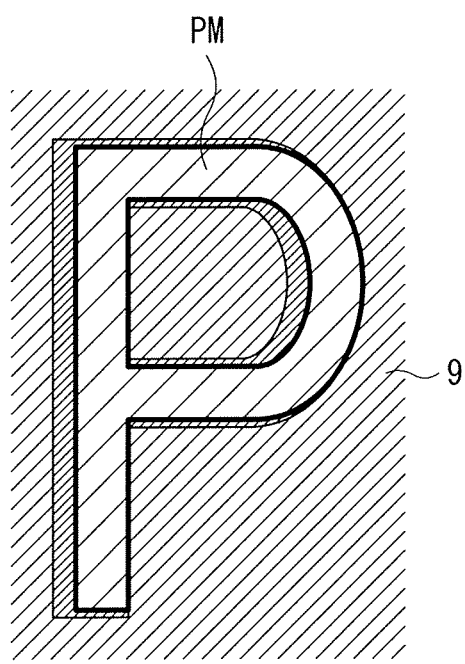
FIG. 13 describes an example of another image formed by the image forming apparatus illustrated in FIG. 1.

FIGS. 11 to 13 each schematically illustrate an example of image formation in a case where a magenta image PM is formed on the recording medium 9 under a condition that the recording medium 9 has a color with low lightness and the magenta image PM has lightness that is higher than the lightness of the color of the recording medium 9. Part (A) of FIG. 11 illustrates a cross-section in a case without the trapping process. Part (B) of FIG. 11 corresponds to Part (A) of FIG. 11, and illustrates a cross-section in a case where a shift occurs between positions, at which the images are formed, relative to each other. Part (C) of FIG. 11 illustrates a cross-section in a case where the trapping process is performed. Part (D) of FIG. 11 corresponds to Part (C) of FIG. 11, and illustrates a cross-section in a case where a shift occurs between positions, at which the images are formed, relative to each other. In these examples, a width WP1 of the magenta image PM and spaces WS1 and WS2 in the case without the trapping process may each be greater than a width WTH that corresponds to the threshold TH3. FIG. 12 illustrates an example of image formation under conditions similar to those in Part (B) of FIG. 11. FIG. 13 illustrates an example of image formation under conditions similar to those in Part (D) of FIG. 11.

Referring to Part (A) of FIG. 11, in the case without the trapping process, the image forming apparatus 1 may form a white image PW on the recording medium 9, and form the magenta image PM on the white image PW in this example. It is possible to reduce a possibility that a user sees the image as if the color of magenta is mixed with the color of the recording medium 9, by thus forming the white image PW below the magenta image PM.

However, a shift may occur between positions, at which the white image PW and the magenta image PM are formed, relative to each other upon the formation of the white image PW and the magenta image PM on the recording medium 9 by the image forming unit 13. In such a case, part of the white image PW having high lightness may be exposed as illustrated in Part (B) of FIG. 11. As a result, the white image PW having the high lightness may be seen in the vicinity of the magenta image PM as illustrated in FIG. 12.

Referring to Part (C) of FIG. 11, the image forming apparatus 1 may expand the magenta image PM by performing the trapping process. Specifically, when the white color image data DW is selected in step S22, the width WP1 and the spaces WS1 and WS2 each may be greater than the width WTH corresponding to the threshold TH3 ("Y" in step S42), and the lightness of the magenta image PM may be higher than the lightness of the color of the recording medium 9 ("Y" in step S43). The image forming apparatus 1 may therefore correct the magenta color image data DM in step S47, and thereby expand the magenta image PM. More specifically, the image forming apparatus 1 may expand the magenta image PM by moving a left edge of the magenta image PM leftward and moving a right edge of the magenta image PM rightward as illustrated in Part (C) of FIG. 11.

This makes it possible for the image forming apparatus 1 to reduce a possibility that the white image PW having the high lightness is exposed as illustrated in Part (D) of FIG. 11 even when a shift occurs between positions, at which the images are formed, relative to each other upon the formation of the images by the image forming unit 13. As a result, it is possible to reduce the possibility that the white image PW having the high lightness to be seen, for example, as illustrated in FIG. 13, thereby improving image quality.

[Specific Example 2]

Figure 14:
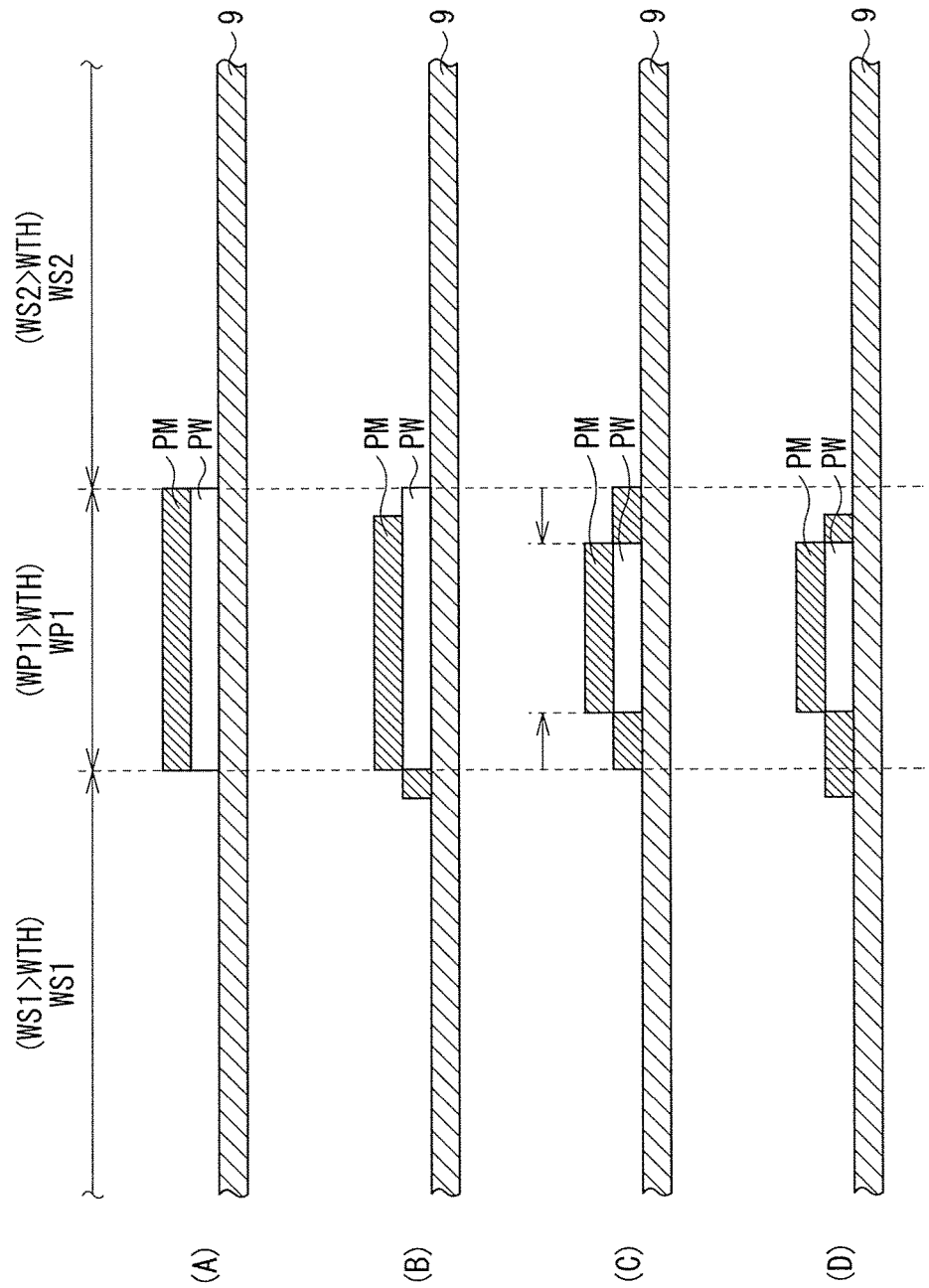
FIG. 14 describes another operation example of the image forming apparatus illustrated in FIG. 1.
Figure 15:
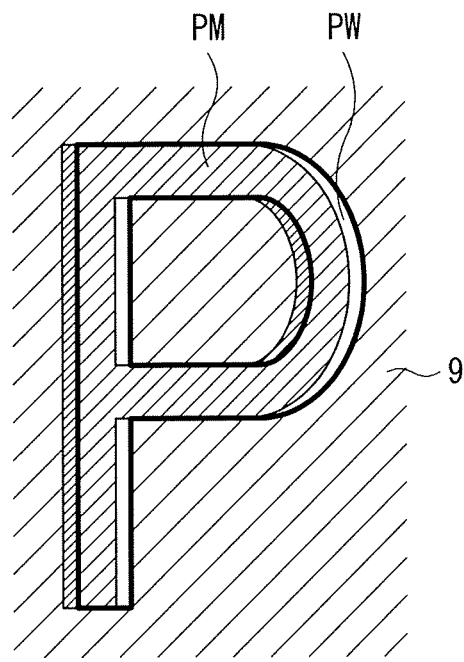
FIG. 15 describes an example of still another image formed by the image forming apparatus illustrated in FIG. 1.
Figure 16:
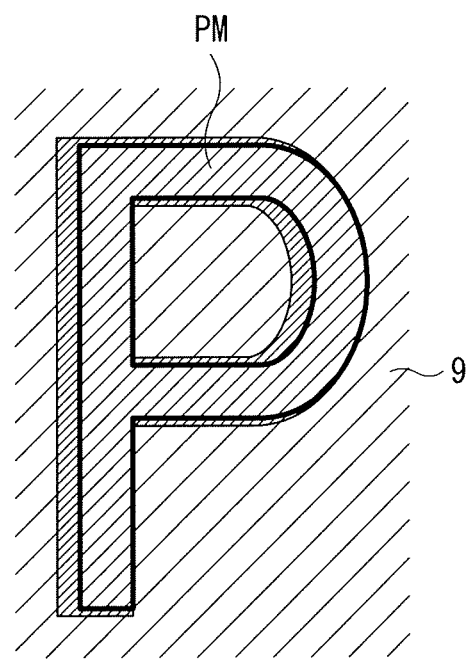
FIG. 16 describes an example of still another image formed by the image forming apparatus illustrated in FIG. 1.
Figure 17:
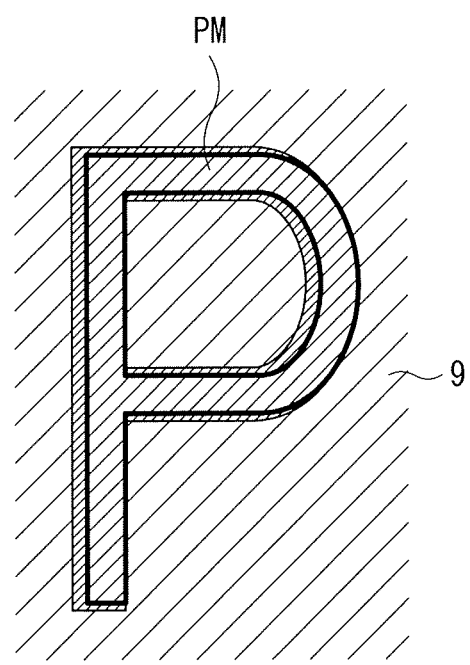
FIG. 17 describes an example of still another image formed by the image forming apparatus illustrated in FIG. 1.

FIGS. 14 to 17 each schematically illustrate an example of image formation in a case where the magenta image PM is formed on the recording medium 9 under a condition that the recording medium 9 has a color with high lightness and the magenta image PM has lightness that is lower than the lightness of the color of the recording medium 9. Part (A) of FIG. 14 illustrates a cross-section in a case without the trapping process. Part (B) of FIG. 14 corresponds to Part (A) of FIG. 14, and illustrates a cross-section in a case where a shift occurs between positions, at which the images are formed, relative to each other. Part (C) of FIG. 14 illustrates a cross-section in a case where the trapping process is performed. Part (D) of FIG. 14 corresponds to Part (C) of FIG. 14, and illustrates a cross-section in a case where a shift occurs between positions, at which the images are formed, relative to each other. FIG. 15 illustrates an example of image formation under conditions similar to those in Part (B) of FIG. 14. FIG. 16 illustrates an example of image formation under conditions similar to those in Part (D) of FIG. 11. FIG. 17 illustrates an example of image formation under conditions similar to those in Part (D) of FIG. 14.

Also in this case, part of the white image PW having high lightness may be exposed as illustrated in Part (B) of FIG. 14, when a shift occurs between positions, at which the white image PW and the magenta image PM are formed, relative to each other upon the formation of the white image PW and the magenta image PM on the recording medium 9 by the image forming unit 13. As a result, the white image PW having the high lightness may be seen in the vicinity of the magenta image PM as illustrated in FIG. 15.

A method of expanding the magenta image PM as that illustrated in Part (C) of FIG. 11 may be employed as a method of making the white image PW to be less exposed. However, an object, i.e., the alphabet "P" in this example, may be seen as if the object has become greater in width as illustrated in FIG. 16 when the foregoing method is employed. Specifically, the recording medium 9 has the color with the high lightness in this example case, which is different from the case illustrated in FIG. 13. This may cause the expanded magenta image PM to be easily seen, causing the object to be seen as if the object has become greater in width.

To address this, the image forming apparatus 1 may narrow the white image PW by performing the trapping process as illustrated in Part (C) of FIG. 14. Specifically, when the magenta color image data DM is selected in step S22, the width WP1 and the spaces WS1 and WS2 each may be greater than the width WTH corresponding to the threshold TH3 ("Y" in step S42), and the lightness of the color of the recording medium 9 may be higher than the lightness of the magenta image PM ("Y" in step S43). The image forming apparatus 1 may therefore correct the white color image data DW in step S47, and thereby narrow the white image PW. More specifically, the image forming apparatus 1 may narrow the white image PW by moving a left edge of the white image PW rightward and moving a right edge of the white image PW leftward as illustrated in Part (C) of FIG. 14.

This makes it possible for the image forming apparatus 1 to reduce a possibility that the white image PW having the high lightness is exposed as illustrated in Part (D) of FIG. 14 and maintain the width of the magenta image PM, even when a shift occurs between positions, at which the images are formed, relative to each other upon the formation of the images by the image forming unit 13. As a result, it is possible to reduce the possibility that the white image PW having the high lightness to be seen without causing the object to be seen as if the object has become greater in width, for example, as illustrated in FIG. 17, thereby improving image quality.

[Specific Example 3]

Figure 18:
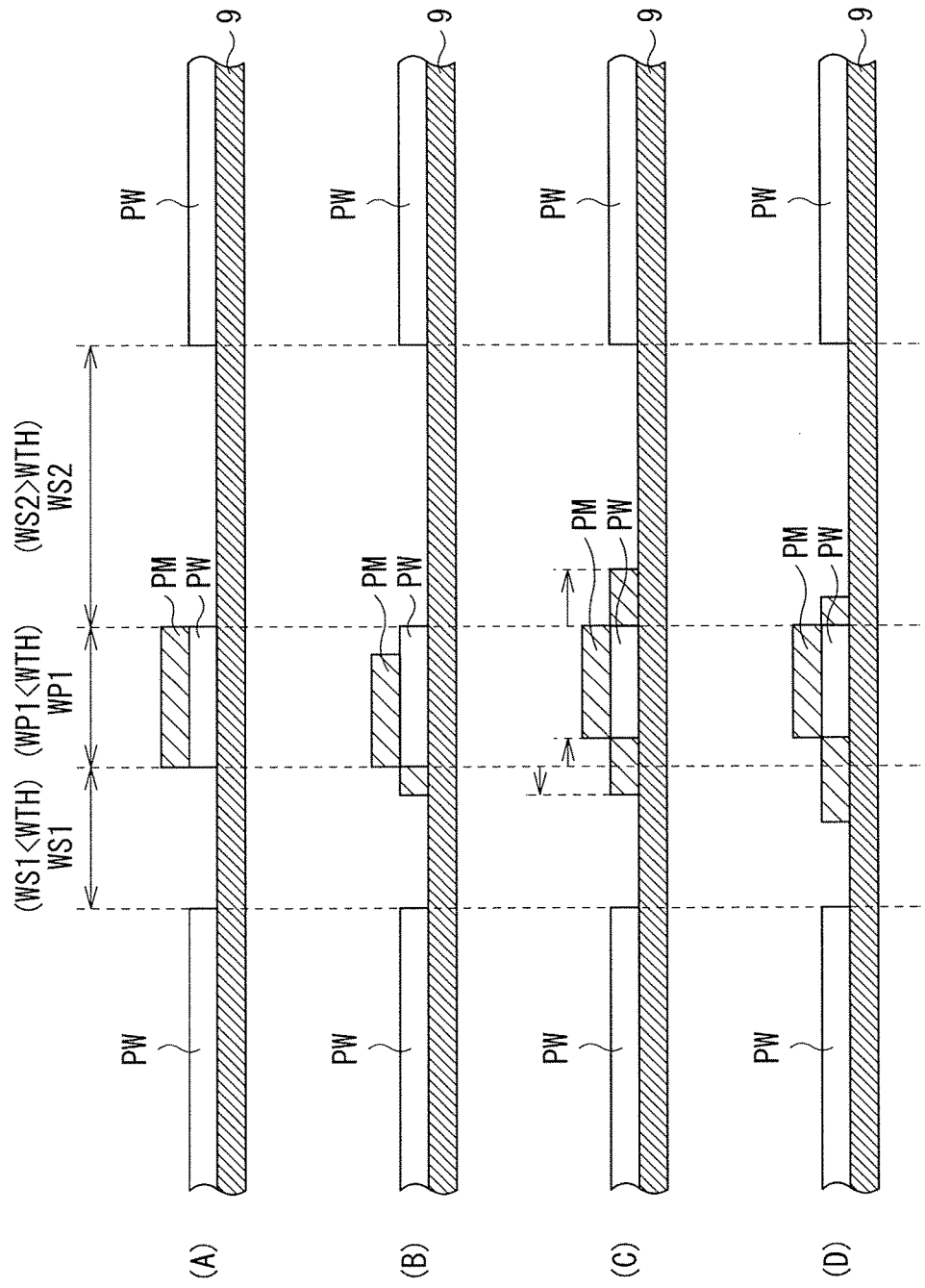
FIG. 18 describes still another operation example of the image forming apparatus illustrated in FIG. 1.

FIG. 18 schematically illustrates an example of image formation in a case where the magenta image PM is formed on the recording medium 9 under a condition that the recording medium 9 has a color with low lightness and the magenta image PM has lightness that is higher than the lightness of the color of the recording medium 9. In this example, the width WP1 of the magenta image PM and the space WS1 in the case without the trapping process each may be smaller than the width WTH that corresponds to the threshold TH3, and the space WS2 may be greater than the width WTH that corresponds to the threshold TH3.

Also in this case, part of the white image PW having high lightness may be exposed as illustrated in Part (B) of FIG. 18, when a shift occurs between positions, at which the images are formed, relative to each other upon the formation of the white image PW and the magenta image PM on the recording medium 9 by the image forming unit 13. In this case, for example, when the magenta image PM is expanded in a manner similar to that illustrated in Parts (C) and (D) of FIG. 11, the magenta image PM may expand into the narrow space WS1. This may degrade image quality.

Referring to Part (C) of FIG. 18, the image forming apparatus 1 may expand the magenta image PM and narrow the white image PW by performing the trapping process. The trapping process in this case may involve moving of both the left edge of the magenta image PM and the left edge of the white image PW in directions opposite to each other. Specifically, when the white color image data DW is selected in step S22, the width WP1 and the space WS1 may be smaller than the width WTH corresponding to the threshold TH3 ("N" in each of steps S42, S44, and S45). The image forming apparatus 1 may therefore correct the magenta color image data DM in steps S46 and S47, and thereby expand the magenta image PM. More specifically, the image forming apparatus 1 may expand the magenta image PM by moving the left edge of the magenta image PM leftward by an amount that is half the amount of movement in the case illustrated in Part (C) of FIG. 11. Alternatively, when the magenta color image data DM is selected in step S22, the width WP1 and the space WS1 may be smaller than the width WTH corresponding to the threshold TH3 ("N" in each of steps S42, S44, and S45). The image forming apparatus 1 may therefore correct the white color image data DW in steps S46 and S47, and thereby narrow the white image PW. More specifically, the image forming apparatus 1 may narrow the white image PW by moving the left edge of the white image PW rightward by an amount that is half the amount of movement in the case illustrated in Part (C) of FIG. 14.

This makes it possible to reduce a possibility that the white image PW having the high lightness is exposed and to reduce a possibility that the magenta image PM expands into the narrow space WS1, as illustrated in Part (D) of FIG. 18, even when a shift occurs between positions, at which the images are formed, relative to each other upon the formation of the images by the image forming unit 13. As a result, it is possible to improve image quality.

[Specific Example 4]

Figure 19:
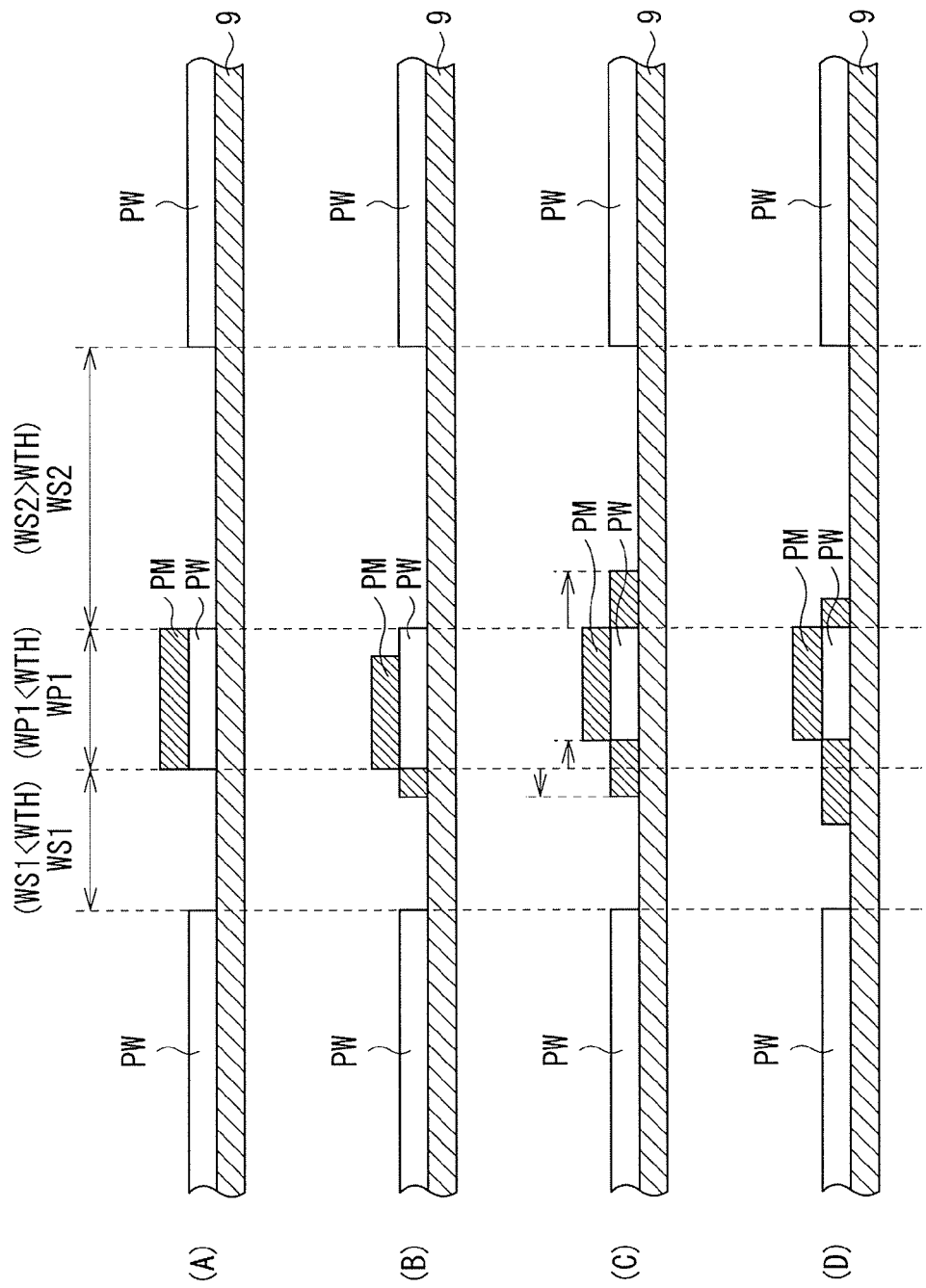
FIG. 19 describes still another operation example of the image forming apparatus illustrated in FIG. 1.

FIG. 19 schematically illustrates an example of image formation in a case where the magenta image PM is formed on the recording medium 9 under a condition that the recording medium 9 has a color with high lightness and the magenta image PM has lightness that is lower than the lightness of the color of the recording medium 9.

Also in this case, part of the white image PW having high lightness may be exposed as illustrated in Part (B) of FIG. 19, when a shift occurs between positions, at which the white image PW and the magenta image PM are formed, relative to each other upon the formation of the white image PW and the magenta image PM on the recording medium 9 by the image forming unit 13. In this case, for example, when the white image PW is narrowed in a manner similar to that illustrated in Part (C) of FIG. 14, the white image PW having the narrow width WP1 may be narrower. This may increase a region in which the color of the recording medium 9 and the color of magenta are seen as if the color of the recording medium 9 and the color of magenta are mixed with each other. This may cause variation in color, thereby degrading image quality.

Referring to Part (C) of FIG. 19, the image forming apparatus 1 may expand the magenta image PM by performing the trapping process. The trapping process in this case may involve moving of the right edge of the magenta image PM. Specifically, when the white color image data DW is selected in step S22, the width WP1 may be smaller than the width WTH corresponding to the threshold TH3 ("N" in step S42), and the space WS2 may be greater than the width WTH corresponding to the threshold TH3 ("Y" in step S44). The image forming apparatus 1 may therefore correct the magenta color image data DM in step S47, and thereby expand the magenta image PM. More specifically, the image forming apparatus 1 may expand the magenta image PM by moving the right edge of the magenta image PM rightward.

This makes it possible for the image forming apparatus 1 to reduce a possibility that the white image PW having the high lightness is exposed, and to reduce a possibility that the color of the recording medium 9 and the color of magenta are seen as if the color of the recording medium 9 and the color of magenta are mixed with each other and thereby cause variation in color in a region having the narrow width WP1, as illustrated in Part (D) of FIG. 19, even when a shift occurs between positions, at which the images are formed, relative to each other upon the formation of the images by the image forming unit 13. As a result, it is possible to improve image quality.

[Effect]

According to the first example embodiment, the color of the recording medium may be detected, and the trapping process may be performed on the basis of the detected color, as described above. It is therefore possible to improve image quality.

According to the first example embodiment, the width of the white image may be narrowed when the width of the image and the spaces of the image are great and when the lightness of the color of the recording medium is higher than the lightness of the images. This reduces a possibility that the object is seen as if the object has become greater in width. It is therefore possible to improve image quality.

According to the first example embodiment, the trapping process may be performed on the basis of the width and the spaces of the images. It is therefore possible to improve image quality.

[Modification 1-1]

Figure 20:
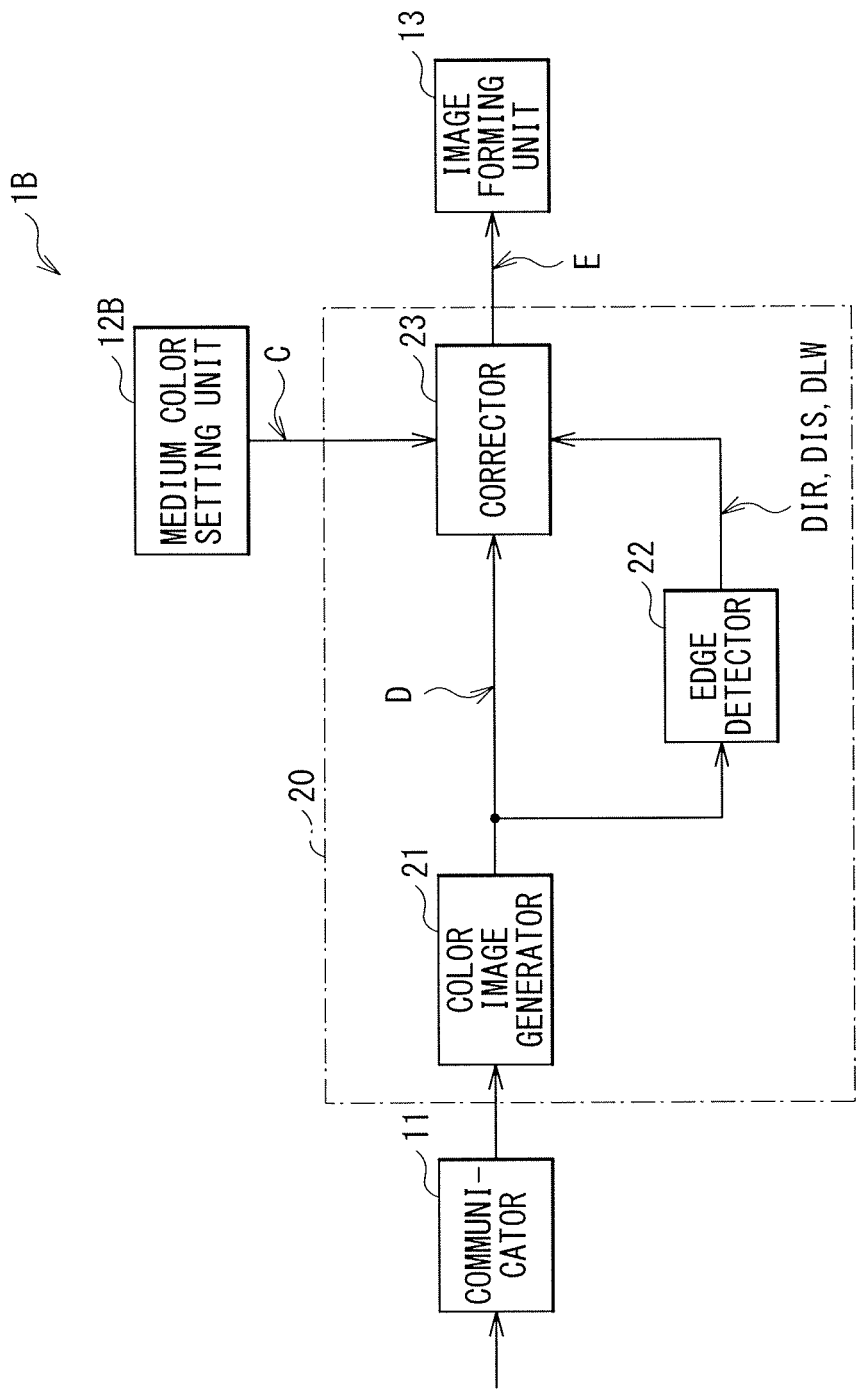
FIG. 20 is a block diagram illustrating a configuration example of an image forming apparatus according to a modification of the first example embodiment.

The first example embodiment has been described above referring to an example in which the medium color sensor 12 is provided and the color of the recording medium 9 is detected by the medium color sensor 12. However, the configuration of the image forming apparatus is not limited to this configuration. Alternatively, a medium color setting unit 12B may be provided as in an image forming apparatus 1B illustrated in FIG. 20, for example. In this example, a user may operate, for example, an operation panel and thereby input the color of the recording medium 9. The medium color setting unit 12B may generate the medium color information C on the basis of a result of this input. Alternatively, for example, recording medium information related to the recording medium 9 may be received together with the print data DP from the host computer. The medium color information C may be generated on the basis of the received recording medium information. Alternatively, for example, a table representing a correspondence relationship between the type of the recording medium and the medium color information C may be stored, for example, in the image forming apparatus 1 or external database. The medium color information C may be generated by referring to this table on the basis of the recording medium information supplied from the host computer.

[Modification 1-2]

The first example embodiment has been described above referring to some examples of the method of generating the edge direction data DIR, the edge distance data DIS, and the width data DLW. However, the method of generating the edge direction data DIR, the edge distance data DIS, and the width data DLW is not limited to the examples referred to in the first example embodiment, and may be any other method.

[Modification 1-3]

The first example embodiment has been described above referring to an example in which lightness is determined on the basis of the medium color information C, the color image data D, etc. However, the method of determining lightness is not limited thereto. Alternatively, lightness may be determined by a variety of existing methods.

[2. Second Example Embodiment]

An image forming apparatus 2 according to a second example embodiment is described below. According to the second example embodiment, the trapping process may be performed without using the width data DLW. It is to be noted that a component substantially the same as that of the image forming apparatus 1 according to the foregoing first example embodiment may be denoted with the same numeral, and will not be further described where appropriate.

Figure 21:
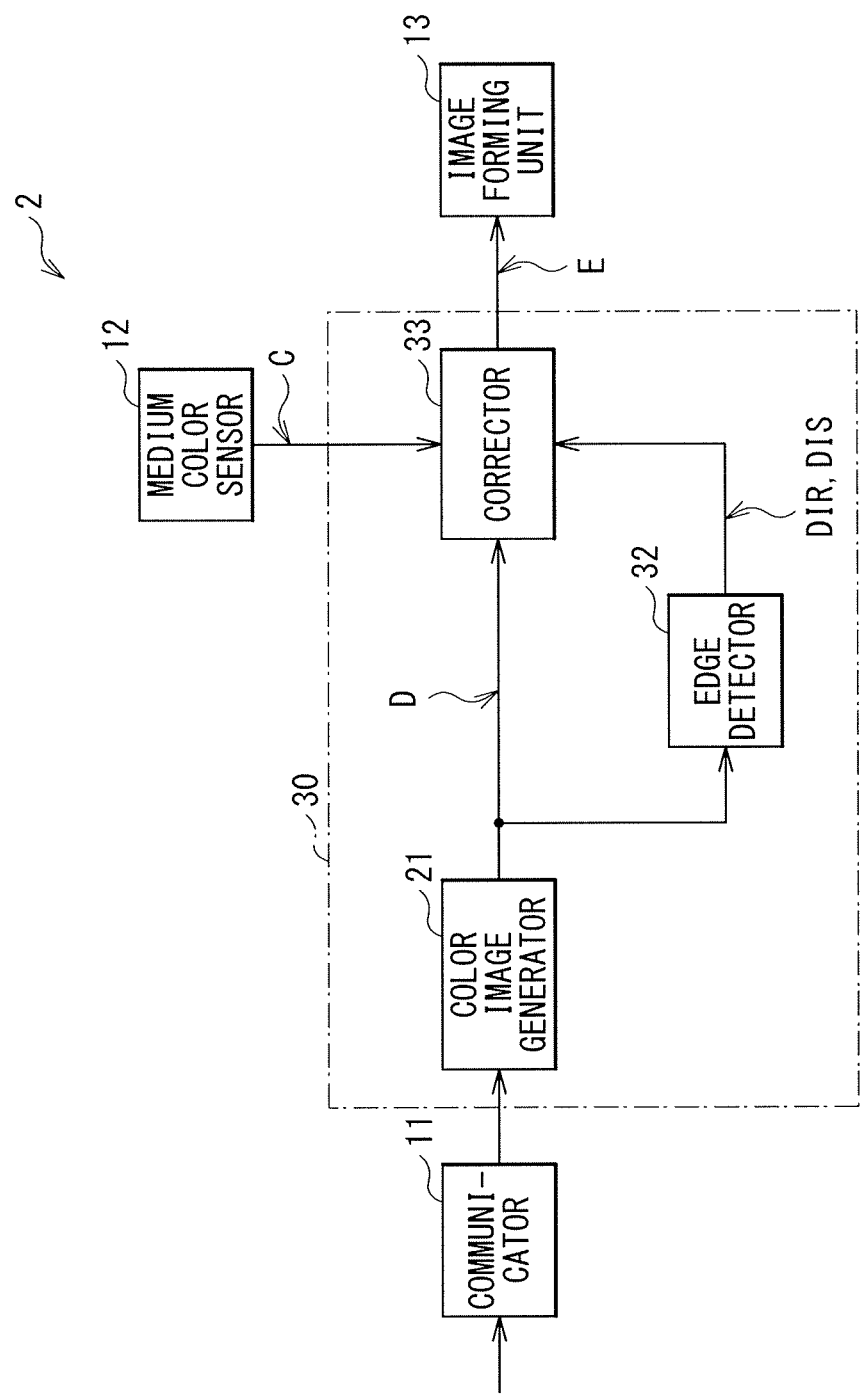
FIG. 21 is a block diagram illustrating a configuration example of an image forming apparatus according to a second example embodiment.

FIG. 21 illustrates a configuration example of the image forming apparatus 2. The image forming apparatus 2 may include an image processor 30. The image processor 30 may include an edge detector 32 and a corrector 33.

The edge detector 32 may detect the edge of the image on the basis of the five pieces of color image data D, as with the edge detector 22 according to the foregoing first example embodiment. Upon the detection of the edge of the image, the edge detector 32 may not generate the width data DLW, and may generate the five pieces of edge direction data DIR and the five pieces of edge distance data DIS.

The corrector 33 may perform the correction process on the five pieces of color image data D, i.e., the color image data DY, DM, DC, DK, and DW, on the basis of the medium color information C, the five pieces of edge direction data DIR, and the five pieces of edge distance data DIS. The correction process may include the trapping process, for example. The corrector 33 may thereby generate the five pieces of color image data E, i.e., the color image data EY, EM, EC, EK, and EW.

Referring to FIG. 2, the image processor 30 may perform the following operation. Specifically, first, the color image generator 21 may generate the five pieces of color image data D, i.e., the color image data DY, DM, DC, DK, and DW, on the basis of the print data DP which the communicator 11 has received (step S1). Thereafter, the edge detector 32 may perform the edge detection process on the five pieces of color image data D (step S52). Specifically, the edge detector 32 may generate the five pieces of edge direction data DIR and the five pieces of edge distance data DIS, on the basis of the five pieces of color image data D. Further, the corrector 33 may perform the correction process on the five pieces of color image data D (step S53). Specifically, the corrector 33 may perform the trapping process on the five pieces of color image data D, on the basis of the medium color information C, the five pieces of edge direction data DIR, and the five pieces of edge distance data DIS. The corrector 33 may thereby generate the five pieces of color image data E.

Figure 22:
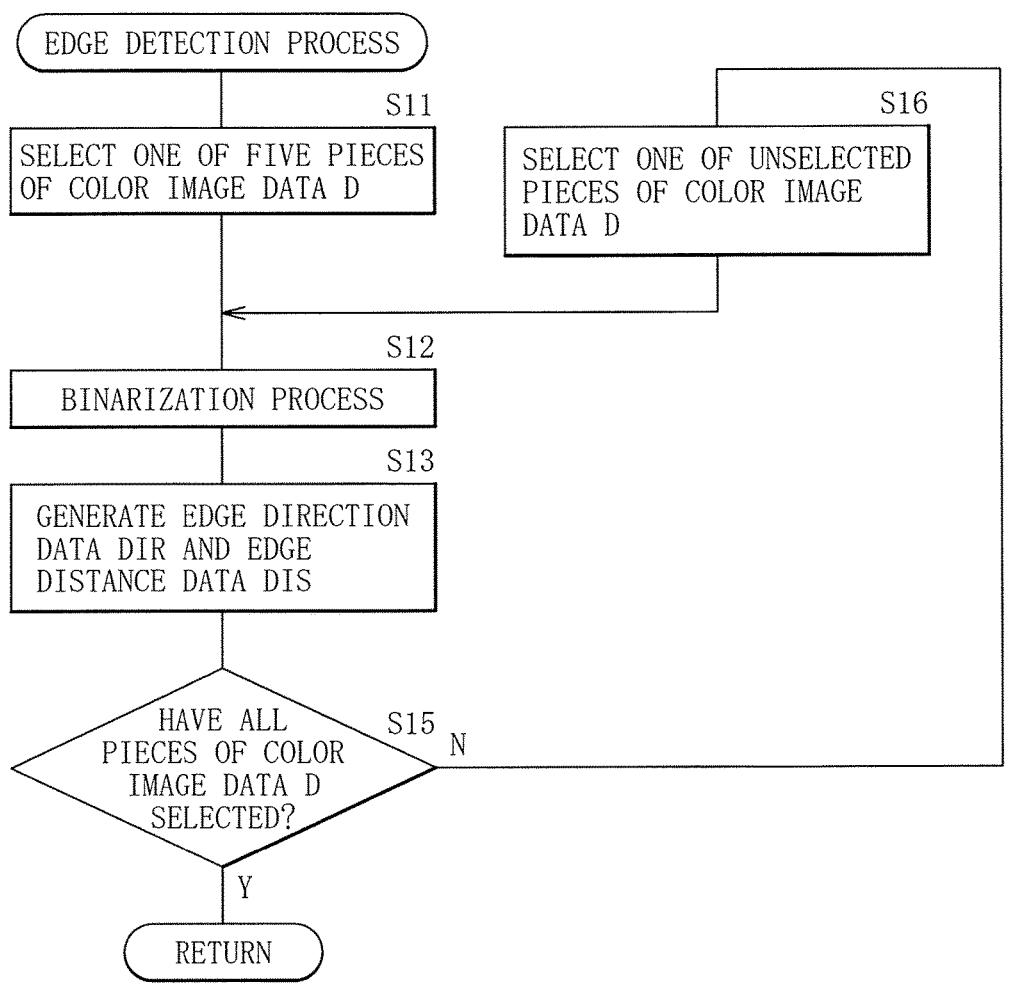
FIG. 22 is a flowchart illustrating an example of an edge detection process according to the second example embodiment.

FIG. 22 illustrates an example of the edge detection process. The edge detector 32 may select one of the five pieces of color image data D, i.e., the color image data DY, DM, DC, DK, and DW (step S11), as with the edge detector 22 in the first example embodiment. The edge detector 32 may perform the binarization process on the selected color image data D, and thereby generate the binary data DBN (step S12). Thereafter, the edge detector 32 may generate the edge direction data DIR and the edge distance data DIS on the basis of the generated binary data DBN (step S13). Thereafter, the edge detector 32 may determine whether all the pieces of color image data D have been selected (step S15). When not all the pieces of color image data D have been selected ("N" in step S15), the edge detector 32 may select one of the unselected pieces of color image data D (step S16), and the operation may return to step S12. When all the pieces of color image data D have been selected ("Y" in step S15), the edge detection process may be brought to the end.

Further, the corrector 33 may perform the correction process illustrated in FIG. 8. The corrector 33 may perform a trapping process in step S55 upon performing of the correction process.

Figure 23:
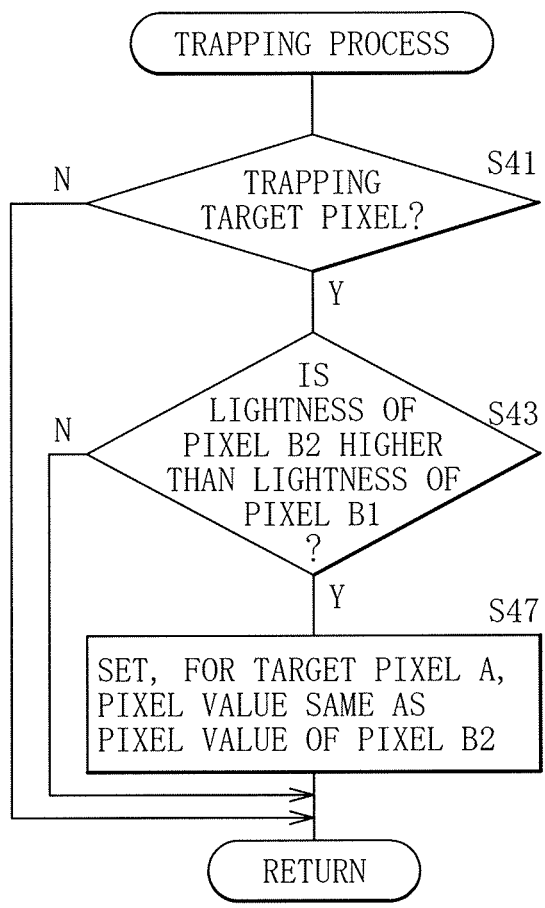
FIG. 23 is a flowchart illustrating an example of a trapping process according to the second example embodiment.

FIG. 23 illustrates an example of the trapping process in step S55.

First, the corrector 33 may determine whether the target pixel A in the selected color image data D is the trapping target pixel by means of the two conditions (step S41), as with the corrector 23 in the first example embodiment. When the target pixel A is not the trapping target pixel ("N" in step S41), the trapping process may be brought to the end.

When the target pixel A is the trapping target pixel in step S41 ("Y" in step S41), the corrector 33 may determine whether the lightness of the pixel B2 is higher than the lightness of the pixel B1 (step S43). When the lightness of the pixel B2 is higher than the lightness of the pixel B1 ("N" in step S43), the trapping process may be brought to the end.

When the lightness of the pixel B2 is higher than the lightness of the pixel B1 in step S43 ("Y" in step S43), the corrector 33 may set, for the target pixel A, a pixel value that is the same as the pixel value of the pixel B2 (step S47).

This may bring the trapping process to the end.

The image forming apparatus 2 may perform an operation as with the operation in Specific Example 1 illustrated in FIGS. 11 to 13 in the foregoing first example embodiment, when the magenta image PM is formed on the recording medium 9 under a condition that the recording medium 9 has a color with low lightness and the magenta image PM has lightness that is higher than the lightness of the color of the recording medium 9. In other words, in such a case, the image forming apparatus 2 may perform the operation as with the operation in Specific Example 1 illustrated in FIGS. 11 to 13 in the foregoing first example embodiment, independently of the factors such as the width WP1 and the spaces WS1 and WS2.

Similarly, the image forming apparatus 2 may perform an operation as with the operation in Specific Example 2 illustrated in FIGS. 14 to 17 in the foregoing first example embodiment, when the magenta image PM is formed on the recording medium 9 under a condition that the recording medium 9 has a color with high lightness and the magenta image PM has lightness that is lower than the lightness of the color of the recording medium 9. In other words, in such a case, the image forming apparatus 2 may perform the operation as with the operation in Specific Example 2 illustrated in FIGS. 14 to 17 in the foregoing first example embodiment, independently of the factors such as the width WP1 and the spaces WS1 and WS2.

According to the second example embodiment, the color of the recording medium may be detected, and the trapping process may be performed on the basis of the detected color, as described above. It is therefore possible to improve image quality.

According to the second example embodiment, the trapping process may be performed without using the width data DLW. It is therefore possible to make the process simple.

[Modification 2]

The modifications described above of the first example embodiment are also applicable to the image forming apparatus 2 according to the second example embodiment.

The technology has been described above with reference to some example embodiments and the modifications thereof. However, the technology is not limited to the example embodiments and the modifications thereof described above, and may be modified in a variety of ways.

For example, the technology is applied to the image forming apparatuses 1 and 2 in the example embodiments and the modifications thereof described above. However, an application of the technology is not limited thereto. Alternatively, the technology is applicable to a multi-function peripheral (MFP) that has functions such as a copy function, a facsimile function, and a scanner function, for example.

For example, the example embodiments and the modifications thereof may be described referring to an example in which the lightness is used as one specific but non-limiting example of the "lightness level" according to one specific but non-limiting embodiment of the technology. However, the "lightness level"" according to one specific but non-limiting embodiment of the technology is not limited thereto. Alternatively, luminance may be used as one specific but non-limiting example of the "lightness level" according to one specific but non-limiting embodiment of the technology.

It is possible to achieve at least the following configurations from the above-described example embodiments of the invention.

(1)

An image forming apparatus including:

an image processor that performs a correction process that corrects first image data corresponding to a first color and second image data corresponding to a second color, the image processor performing the correction process by causing, on a basis of a medium color of a recording medium, a first edge of a first image that is in the first image data and a second edge of a second image that is in the second image data to be away from each other, the second edge corresponding to the first edge; and an image forming unit that forms the first image and the second image in this order on the recording medium, on a basis of the first image data and the second image data that are corrected by the image processor.

(2)

The image forming apparatus according to (1), wherein the image processor makes a comparison between a first lightness level of the medium color and a second lightness level of a region in vicinity of the second edge of the second image, and performs the correction process on a basis of a result of the comparison.

(3)

The image forming apparatus according to (2), wherein the image processor performs the correction process by moving the first edge and thereby reducing area of the first image, when the first lightness level is higher than the second lightness level.

(4)

The image forming apparatus according to (2) or (3), wherein the image processor performs the correction process by moving the second edge and thereby increasing area of the second image, when the second lightness level is higher than the first lightness level.

(5)

The image forming apparatus according to (2), wherein the image processor further determines an image width on a basis of the second image data, and performs the correction process on a basis of a result of a comparison between the image width and a predetermined width, the image width being a width between the second edge and an edge, of the second image, that faces the second edge.

(6)

The image forming apparatus according to (5), wherein the image processor performs the correction process by moving the second edge and thereby increasing area of the second image, when the image width is smaller than the predetermined width.

(7)

The image forming apparatus according to (5) or (6), wherein the image processor performs the correction process by moving the first edge and thereby reducing area of the first image, when the image width is greater than the predetermined width and the first lightness level is higher than the second lightness level.

(8)

The image forming apparatus according to any one of (5) to (7), wherein the image processor performs the correction process by moving the second edge and thereby increasing area of the second image, when the image width is greater than the predetermined width and the second lightness level is higher than the first lightness level.

(9)

The image forming apparatus according to any one of (5) to (8), wherein the image processor further determines an image space on a basis of the first image data, and performs the correction process on a basis of a result of a comparison between the image space and a predetermined space, the image space being a distance between the first edge and an edge, of the first image, that faces the first edge.

(10)

The image forming apparatus according to (9), wherein the image processor performs the correction process by moving the first edge and thereby reducing area of the first image while moving the second edge and thereby increasing area of the second image, when the image width is smaller than the predetermined width and the image space is smaller than the predetermined space.

(11)

The image forming apparatus according to (10), wherein the image processor performs the correction process by moving the second edge and thereby increasing the area of the second image, when the image width is smaller than the predetermined width and the image space is greater than the predetermined space, and a first amount is smaller than a second amount, the first amount being an amount by which the second edge is moved when the image width is smaller than the predetermined width and the image space is greater than the predetermined space, the second amount being an amount by which the second edge is moved when the image width is smaller than the predetermined width and the image space is smaller than the predetermined space.

(12)

The image forming apparatus according to any one of (1) to (11), further including a sensor that detects the medium color.

(13)

The image forming apparatus according to any one of (1) to (11), further including a setting unit with which a user sets the medium color.

(14)

The image forming apparatus according to any one of (1) to (13), wherein the first color is white.

(15)

The image forming apparatus according to any one of (1) to (14), wherein the second color is one of yellow, magenta, cyan, and black.

According to the image forming apparatus of one embodiment of the technology, the correction is performed on the first image data and the second image data by causing the first edge of the first image and the second edge of the second image to be away from each other on the basis of the medium color of the recording medium.

Although the technology has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. An image forming apparatus that develops an image by application of multiple developers and that corrects print color prior to development based on recording medium information, the image forming apparatus, comprising:
    a communicator that receives print data;
    a medium color input device that comprises a color sensor or a setting unit that determines medium color of a recording medium;
    an image processor that comprises:
        a color image generator that receives the print data from the communicator and that generates color image data including first image data corresponding to a first developer having a first color, and second image data corresponding to a second developer that is different from the first developer and that has a second color, on the basis of the print data, the first image data having a first image region and a first region, the second image data having a second image region and a second region, the first image region being a region in which a first image is provided, the second image region being a region in which a second image is provided, the first region and the second region each being a region in which no developer is applied during image development and the recording medium is exposed;
        an edge detector that detects a first edge, which is a region adjacent to the first region, and a second edge, which is a region adjacent to the second region; and
        a corrector that receives the medium color inputted from the medium color input device and that performs a correction process that corrects the first image data and the second image data; and
    an image forming unit that forms on the recording medium, based on the first image data and the second image data, after correction by the image processor and in the order recited, the first image by application of the first developer having the first color and the second image by application of the second developer having the second color
    wherein the image processor performs a correction process that corrects the first image data and the second image data by causing, based on the medium color of the recording medium, the first edge adjacent to the first region that is in the first image data and the second edge adjacent to the second region that is in the second image data, which first edge and second edge initially correspond to one another, to be separated from each other instead of the first edge and the second edge being superimposed.

2. The image forming apparatus according to claim 1, wherein the image processor makes a comparison between a first lightness level of the medium color and a second lightness level of the second region of the second edge of the second image and performs the correction process based on a result of the comparison.

3. The image forming apparatus according to claim 2, wherein, when the first lightness level is higher than the second lightness level, the image processor performs the correction process by moving the first edge in a manner effective for reducing area of the first image.

4. The image forming apparatus according to claim 2, wherein, when the second lightness level is higher than the first lightness level, the image processor performs the correction process by moving the second edge in a manner effective for increasing area of the second image.

5. The image forming apparatus according to claim 2, wherein the second image has a width between the second edge and an edge of the second image that faces the second edge and that is an additional region adjacent to the second image, and wherein the image processor determines the image width based on the second image data and performs the correction process based on a result of a comparison between the width of the second image and a predetermined width.

6. The image forming apparatus according to claim 5, wherein, when the width of the second image is smaller than the predetermined width, the image processor performs the correction process by moving the second edge in a manner effective for increasing area of the second image.

7. The image forming apparatus according to claim 5, wherein, when the width of the second image is greater than the predetermined width and the first lightness level is higher than the second lightness level, the image processor performs the correction process by moving the first edge in a manner effective for reducing area of the first image.

8. The image forming apparatus according to claim 5, wherein, when the width of the second image is greater than the predetermined width and the second lightness level is higher than the first lightness level, the image processor performs the correction process by moving the second edge in a manner effective for increasing area of the second image.

9. The image forming apparatus according to claim 5, wherein the image processor determines an image spacing, that is a distance between the first edge and an edge of the first image that faces the first edge and that is an additional region adjacent to the first image, based on the first image data and performs the correction process based on a result of a comparison between the image spacing and a predetermined spacing.

10. The image forming apparatus according to claim 9, wherein, when the width of the second image is smaller than the predetermined width and the image spacing of the first image is smaller than the predetermined spacing the image processor performs the correction process by moving the first edge in a manner effective for reducing area of the first image while moving the second edge in a manner effective for increasing area of the second image.

11. The image forming apparatus according to claim 10, wherein, when the width of the second image is smaller than the predetermined width and the image spacing of the first image is greater than the predetermined spacing, the image processor performs the correction process by moving the second edge in a manner effective for increasing the area of the second image, and
   wherein a first amount is an amount by which the second edge is moved when the width of the second image is smaller than the predetermined width and the image spacing is greater than the predetermined space, and
   wherein a second amount is an amount by which the second edge is moved when the width of the second image is smaller than the predetermined width and the image spacing of the first image is smaller than the predetermined space, and
   wherein the first amount is smaller than the second amount.

12. The image forming apparatus according to claim 1, wherein the first color is white.

13. The image forming apparatus according to claim 1, wherein the second color is one of yellow, magenta, cyan, and black.

14. The image forming apparatus according to claim 1, wherein the recording medium information includes information for medium color of the recording medium.

15. The image forming apparatus according to claim 1, wherein the recording medium information includes information on various types of recording media, and the setting unit of the medium color input device has a look-up table that represents a correspondence relationship between the type of the recording medium and the medium color and acquires the information on the medium color on the basis of the look-up table.

16. An image forming apparatus that develops an image by application of multiple developers and that corrects print color prior to development based on recording medium information, the image forming apparatus, comprising:
   a communicator that receives print data DP;
   a medium color input device that comprises a color sensor or a setting unit that determines medium color of a recording medium;
   an image processor that comprises:
      a color image generator that receives the print data from the communicator and that generates color image data including first image data corresponding to a first developer having a first color, and second image data corresponding to second developer that is different from the first developer and that has a second color, on the basis of the print data, the first image data having a first image region and a first region, the second image data having a second image region and a second region, the first image region being a region in which a first image is provided, the second image region being a region in which a second image is provided, the first region and the second each being a region in which no developer is applied during image development and the recording medium is exposed;
      an edge detector that detects a first edge, which is a region adjacent to the first region, and a second edge, which is a region adjacent to the second region; and
      a corrector that receives the medium color inputted from the medium color input device and that performs a correction process that corrects the first image data and the second image data; and
   an image forming unit that forms on the recording medium, based on the first image data and the second image data, after correction by the image processor and in the order recited, the first image by application of the first developer having the first color and the second image by application of the second developer having the second color,
   wherein the image processor performs a correction process that corrects the first image data and the second image data by causing, based on the medium color of the recording medium, the first edge adjacent to the first region that is in the first image data and the second edge adjacent to the second region that is in the second image data, which first edge and second edge initially correspond to one another, to be separated from each other instead of the first and second edges being superimposed,
   wherein the image processor makes a comparison between a first lightness level of the medium color and a second lightness level of a region in a vicinity of the second edge of the second image and performs the correction process based on a result of the comparison, and wherein, when the first lightness level is higher than the second lightness level, the image processor performs the correction process by moving the first edge in a manner effective for reducing area of the first image.

* * * * *